(12) United States Patent
Kobayashi et al.

(10) Patent No.: US 6,931,732 B2
(45) Date of Patent: Aug. 23, 2005

(54) BUSH CUTTING MACHINE

(75) Inventors: Takao Kobayashi, Wako (JP); Atsushi Kojima, Wako (JP); Kenjiro Hiratsuna, Wako (JP); Akito Kono, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/825,552

(22) Filed: Apr. 14, 2004

(65) Prior Publication Data

US 2004/0194321 A1 Oct. 7, 2004

Related U.S. Application Data

(62) Division of application No. 10/045,490, filed on Jan. 11, 2002, now Pat. No. 6,823,591.

(30) Foreign Application Priority Data

Jan. 11, 2001 (JP) ........................................ 2001-004233
Jan. 15, 2001 (JP) ........................................ 2001-006314
Jan. 15, 2001 (JP) ........................................ 2001-006352

(51) Int. Cl.$^7$ .............................................. A01D 69/10
(52) U.S. Cl. ........................................ 30/276; 477/200
(58) Field of Search ................................ 30/276, 277.4; 56/12.7, 10.5, 11.3; 403/177, 303; 477/199–202

(56) References Cited

U.S. PATENT DOCUMENTS

| 3,290,871 | A | * | 12/1966 | Haas | 56/10.5 |
|---|---|---|---|---|---|
| 4,006,528 | A | * | 2/1977 | Katsuya | 30/276 |
| 5,636,444 | A | * | 6/1997 | Nickel | 30/276 |
| 5,947,866 | A | * | 9/1999 | Nagashima | 477/200 |
| 6,055,797 | A | * | 5/2000 | Nagashima | 56/11.3 |
| 6,125,547 | A | * | 10/2000 | Nagashima | 30/276 |
| 6,167,973 | B1 | * | 1/2001 | Nagashima | 173/221 |
| 6,196,082 | B1 | * | 3/2001 | Iwata | 74/501.6 |

FOREIGN PATENT DOCUMENTS

JP          1-116340      *   5/1989

\* cited by examiner

*Primary Examiner*—Kenneth E. Peterson
(74) *Attorney, Agent, or Firm*—Adams & Wilks

(57) ABSTRACT

A bush cutting machine including has an operation rod, a cutter blade mounted to the front end of the operation rod for undergoing rotation, and a prime mover mounted to the rear end of the operation rod for rotationally driving the cutter blade. A throttle lever is pivotally mounted with respect to the operation rod for controlling an opening degree of a throttle valve of the prime mover to adjust a rotational speed of the cutter blade. A brake unit stops rotation of the cutter blade. A link mechanism is disposed in close proximity to the prime mover and is actuated by operation of the throttle lever to adjust the degree of opening of the throttle valve of the prime mover and to release the brake unit from a braking condition.

2 Claims, 28 Drawing Sheets

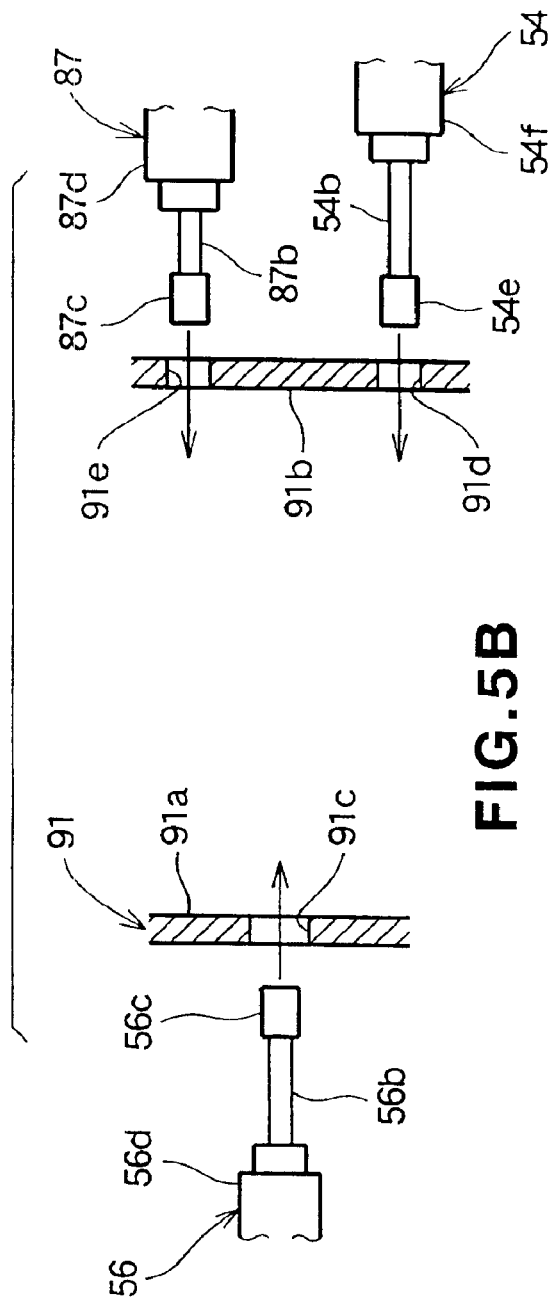
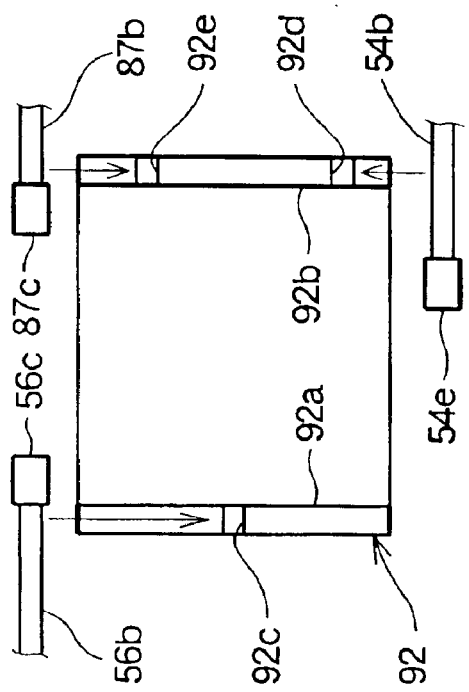
FIG.5A
FIG.5B

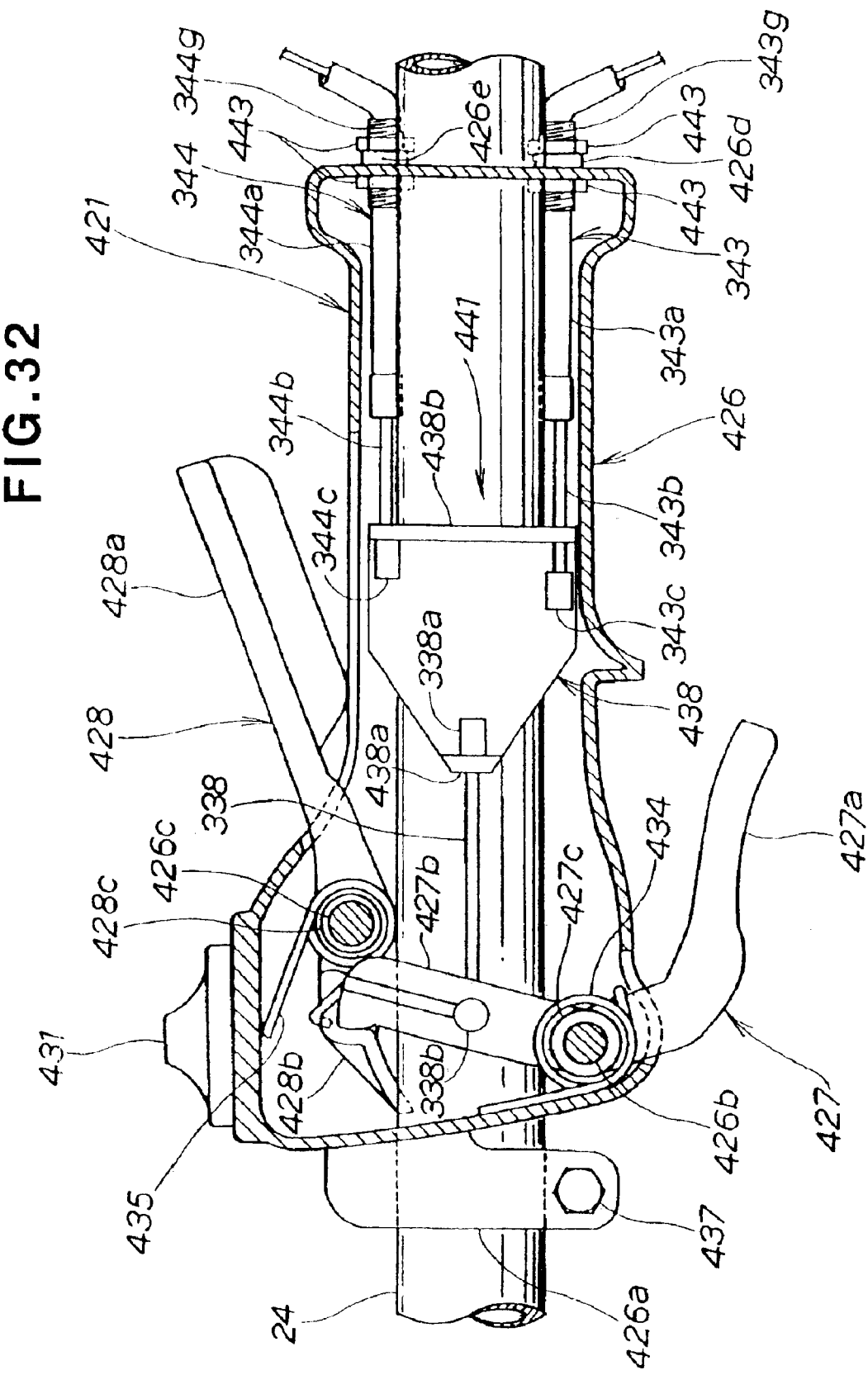

BUSH CUTTING MACHINE

CROSS-REFERENCE TO RELATED APPLICATIONS

This application is a divisional application of U.S. patent application Ser. No. 10/045,490 filed Jan. 11, 2002, now U.S. Pat. No. 6,823,591.

FIELD OF THE INVENTION

This invention relates to a bush cutting machine having a lever with improved operability in performing throttle adjustment and braking a cutter blade and brake releasing of the latter.

BACKGROUND OF THE INVENTION

There have been known various bush cutting machines which include a throttle adjustment unit mounted in a prime mover for adjusting the rotational speed of a cutter blade, and a brake unit provided in a drive power transmission path between the cutter blade and the prime mover for applying the brakes to the cutter blade. Typical examples of such bush cutting machines are disclosed in Japanese Utility Model Laid-Open Publication No. SHO-51-53248 and Japanese Patent Laid-Open Publication No. SHO-52-145135.

The bush cutting machine disclosed in SHO-51-53248 comprises a rotary cutter or blade connected to the prime mover via a clutch and a driven shaft, and a handle carrying a brake lever connected via a wire to a brake shoe of the brake unit. When the brake lever is released from a gripped state, the brake shoe is urged against an outer circumferential periphery of the driven shaft to apply the brakes to the rotary cutter.

In the thus-arranged bush cutting machine, for adjusting the rotational speed of the rotary cutter using the throttle lever, an operator is required to perform respective operations of the throttle lever and the brake lever in a well-timed fashion during a bush cutting operation, for example, by operating the throttle lever in such a manner as to gradually increase the rotational speed of the rotary cutter while gripping the brake lever to gradually release the brakes from the rotary cutter, thus requiring the operator to have a skill in operating the levers. Further, since the operator needs not only to perform a lever operation with his hand but also to maintain an attitude of the bush cutting machine during work, the levers must be desirably operated in a possible simplest way with a view to improve workability and minimize operator's fatigue.

The bush cutting machine disclosed in SHO-52-145135 comprises a cutter blade connected to the prime mover via a rotary shaft, a handle rod mounted to an operation rod through which the rotary shaft passes, a brake lever and a throttle lever both mounted to the handle rod, a brake lever connected via a wire to a brake section for braking the cutter blade, a throttle lever connected to a throttle valve mechanism via a wire, and a control box provided midway of the wires for linking the wires to one another. The control box includes a control body rotatably secured to a pivot shaft. The wires are connected to respective ends of the control body.

In the bush cutting machine of SHO-52-145135, the brake section and the throttle valve mechanism are interlinked to each other through operation of the brake lever. However, the presence of the control box provided midways of the wires makes the structure complicated with a resultant difficulty compelled in assemblage of the control box and the wires. Further, in the bush cutting machine, since an outer tube between the control box and the throttle lever and the outer tube between the control box and the throttle valve mechanism warp largely and return to their original positions upon operation of the throttle lever, the outer tubes interfere with an operator and disturb his work. Moreover, the control box has component parts, provided at the pivot shaft, the control body and the respective ends of the control body, for mounting the wires, thereby increasing the number of component parts.

SUMMARY OF THE INVENTION

It is therefore an object of the present invention to provide a bush cutting machine which has a lever with improved operability in adjusting the opening degree of a throttle valve and braking and unbraking a cutter blade, and which is simplified in structure to provide improved workability and assemblage efficiency.

According to an aspect of the present invention, there is provided a bush cutting machine which comprises: an operation rod; a cutter blade mounted to a front end of the operation rod; a prime mover mounted to a rear part of the operation rod for driving the cutter blade; a throttle lever for adjusting a throttle of the prime mover; a brake unit for stopping rotation of the cutter blade driven by the prime mover; and a link mechanism actuated by operation of the throttle lever to adjust the degree of opening of the throttle and to release the brake unit from a braking condition.

In the bush cutting machine thus arranged, by operating the throttle lever, adjustment of the opening degree of the throttle and actuation of the brake unit and releasing of the brakes can be effected for thereby improving the operability of the bush cutting machine and the workability of the latter. Also, the presence of the relay member, serving as a link mechanism, located in close proximity to the prime mover, that is, the presence of the link mechanism mounted to a cover of the brake unit adjacent the prime mover, allows the single piece of main cable to be located between the handle and the link mechanism closer to the prime mover when the throttle lever is mounted to the throttle lever, resulting in a simplified structure around the handle.

Desirably, the link mechanism includes a delay mechanism to be actuated by operation of the throttle lever such that the throttle opens with a time delay from the releasing of the brakes. As a result, operation of the throttle lever alone causes the brake unit to be released from a braking condition and then the throttle to open. This sequence of operations can be performed smoothly.

In a specific form, the link mechanism is housed in an operating lever unit, which serves as a grip of the handle mounted to the operation rod. This arrangement makes the bush cutting machine compact in structure.

Preferably, the bush cutting machine further comprises a single piece of throttle cable extending between the throttle lever and the brake unit. The link mechanism may be provided midway of the single throttle cable so that both the opening degree adjustment of the throttle and the releasing of the brake unit from the braking condition can be achieved by the single throttle cable. This results in reduction of the number of cables, thereby providing a simplified structure around the handle.

BRIEF DESCRIPTION OF THE DRAWINGS

Certain preferred embodiments of the present invention will be described in more detail below, by way of example only, with reference to the accompanying drawings, in which:

FIGS. 5A and 5B are schematic views illustrating a manner of assemblage of the relay member shown in FIG. 4 and the relationship between the main wire, the throttle wire and the brake wire;

FIG. 32 is a view illustrating a modified form of the third preferred embodiment, with a relay member as a link mechanism incorporated in the operating lever unit of FIG. 1.

DETAILED DESCRIPTION OF THE PREFERRED EMBODIMENTS

The following description is merely exemplary in nature and is in no way intended to limit the invention, its application or uses.

Figure 1:
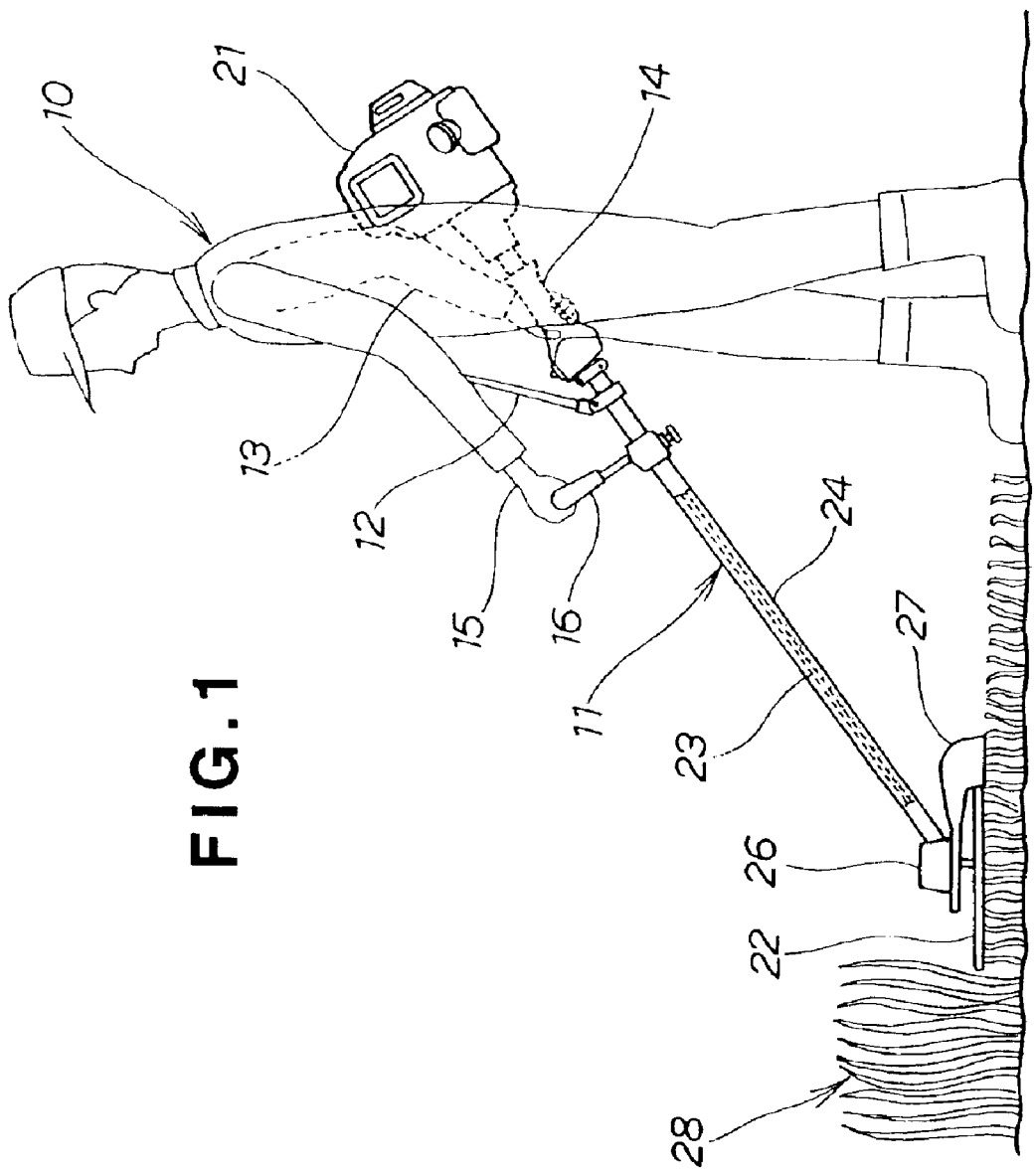
FIG. 1 is a side view illustrating one example of a bush cutting machine according to the present invention in practical use.

When in use as shown in FIG. 1, a bush cutting machine 11 according to a first preferred embodiment of the present invention is suspended from a shoulder of an operator 10 via a shoulder strap 12 with an operating lever unit 14, mounted to the bush cutting machine 11, held by a right hand 13 of the operator 10 while a handle 16 is held by a left hand 15 of the operator 10 for carrying out bush cutting work.

The bush cutting machine 11 includes an engine 21 serving as a prime mover, a cutter blade 22 driven by the engine 21, a transmission shaft 23 for transmitting drive power from the engine 21 to the cutter blade 22, an operation rod 24 interposed between the engine 21 and the cutter blade 22 for accommodating therein the transmission shaft 23, the operating lever unit 14 mounted to the operation rod 24 adjacent the engine 21, and a loop shaped handle 16 mounted to the operation rod 24 at a location remote from the operating lever unit 14 in a direction toward the cutter blade 22. A reference numeral 26 designates a gear case which is interposed between a distal end of the operation rod 24 and the cutter blade 22. In order to protect the operator 10 at his feet during cutting operation of weeds 28, the cutter blade 22 is partially concealed with a cover 27.

Figure 2:
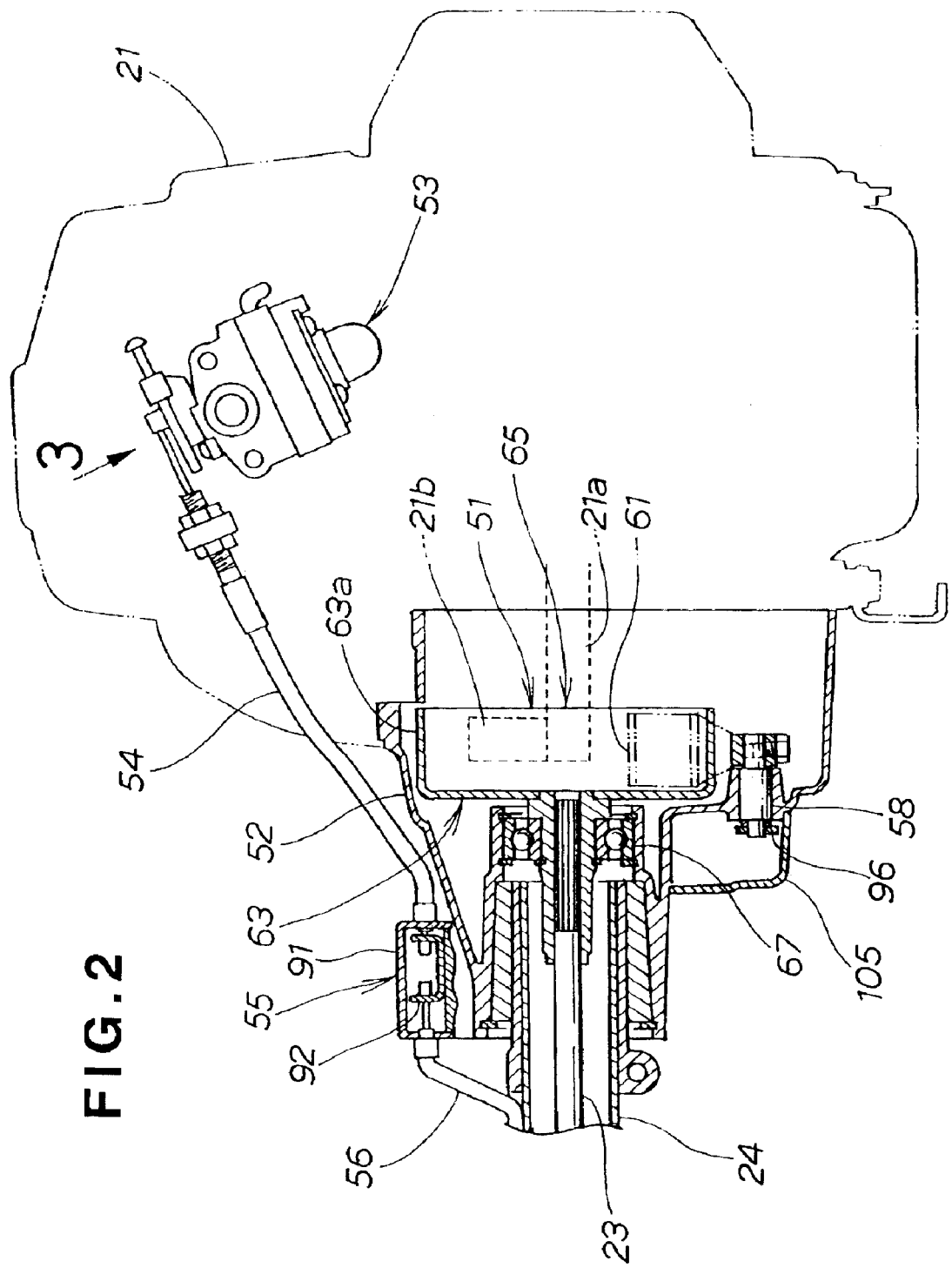
FIG. 2 is an enlarged view of a front portion of an engine, illustrating an example arrangement wherein a relay member serving as a link mechanism is mounted inside a cover of a brake unit of the bush cutting machine according to a first preferred embodiment of the present invention.

In FIG. 2, a centrifugal clutch 51 is mounted to a front portion of the engine 21. The centrifugal clutch 51 connects or disconnects a power delivery path from the engine 21 to the transmission shaft 23. The centrifugal clutch 51 is incorporated in a clutch case 52 mounted to the front portion of the engine 21. The operation rod 24 is mounted to a front portion of the clutch case 52. A carburetor 53 is mounted to a side portion of the engine 21. One end of a throttle cable 54 is connected to the carburetor 53. The other end of the throttle cable 54 is connected to a relay member 55. One end of a main cable 56, which extends from the operating lever 14 shown in FIG. 1, is connected to the relay member 55. A brake shoe 61, which forms a part of a brake unit 65, is mounted to a pivot shaft 58 which is rotatably mounted to a lower portion of the clutch case 52.

The centrifugal clutch 51 includes a weight 21b fixed to the output shaft 21a of the engine 21, and a cup shaped drum 63 with which the weight 21b, swinging due to a centrifugal force exerted when the output shaft 21a exceeds a given rotational speed, is brought into engagement. Mounted to a bottom portion of the drum 63 is an end of the transmission shaft 23. The brake unit 65 compels the brake shoe 61 to be urged against an outer periphery 63a of the drum 63 to apply a brake to the rotation of the drum 63 for thereby braking the rotations of the transmission shaft 23 and the cutter blade 22 shown in FIG. 1. The clutch case 52 also serves as a cover for concealing the brake unit 65. The end of the transmission shaft 23 is rotatably supported with the clutch case 52 via a bearing 67, and the other end of the transmission shaft 23 is rotatably supported in the gear case 26 of FIG. 1.

Figure 3:
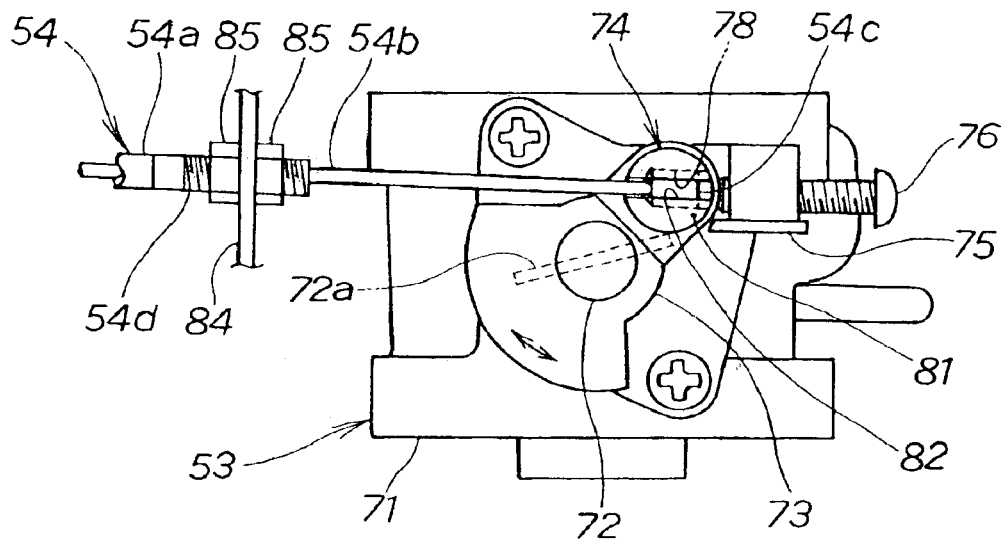
FIG. 3 is a partial view, as seen in the direction of arrow 3 of FIG. 2, illustrating a relationship between a throttle wire and a throttle arm.

FIG. 3 shows the relationship between the carburetor 53 and the throttle cable 54.

In FIG. 3, the carburetor 53 includes a case 71, a throttle valve 72a for opening or closing an air intake passage formed in the case 71, a throttle shaft 72 to which the throttle valve 72a is mounted, a throttle arm 73 fixed to the throttle shaft 72, a strut shaped wire mount portion 74 rotatably mounted to an end of the throttle arm 73, a stopper portion 75 which permits the throttle valve 2a to be retained at a fully open position when the throttle arm 73 is rotated counterclockwise about a center of the throttle shaft 72, a screw 76 whose distal end is held in abutting contact with the end of the throttle arm 73 to enable adjustment of a fully closed position of the throttle valve 72a.

The wire mount portion 74 has a transverse bore 78 formed in a direction perpendicular to an axis of the strut and extending from a side of the strut, and a transverse recess 82 formed in an upper surface 81 of the wire mount portion 74 in parallel with the transverse bore 78. The transverse bore 78 and the transverse recess 82 are connected to one another. A width of the transverse recess 82 is smaller in size than the inner diameter of the transverse bore 78 but is larger than a diameter of the throttle wire 54b.

The throttle cable 54 includes a throttle tube 54a, the throttle wire 54b moveably inserted through the throttle tube 54a, a cylindrical member 54c mounted to a distal end of the throttle wire 54b, and a throttle tube terminal member 54d which allows one end of the throttle tube 54a to be mounted to a bracket 84 formed on the engine 21 shown in FIG. 2.

To connect the throttle wire 54b to the sire mount portion 74 of the carburetor 53, the throttle wire 54b is inserted through the transverse bore 78 via the transverse recess 82 and, then, the cylindrical member 54c, mounted to the distal end of the throttle wire 54b, is inserted through the transverse bore 78 to allow the cylindrical member 54c to engage the wire mount portion 74.

In order to adjust the tension of the throttle wire 54b, nuts 85, 85, which are screwed onto a male thread formed on the throttle tube terminal member 54d, are rotated and loosened, permitting the throttle tube terminal member 54d to be longitudinally moved by a given distance and subsequently allowing the nuts 85, 85 to be tightened.

Figure 4:
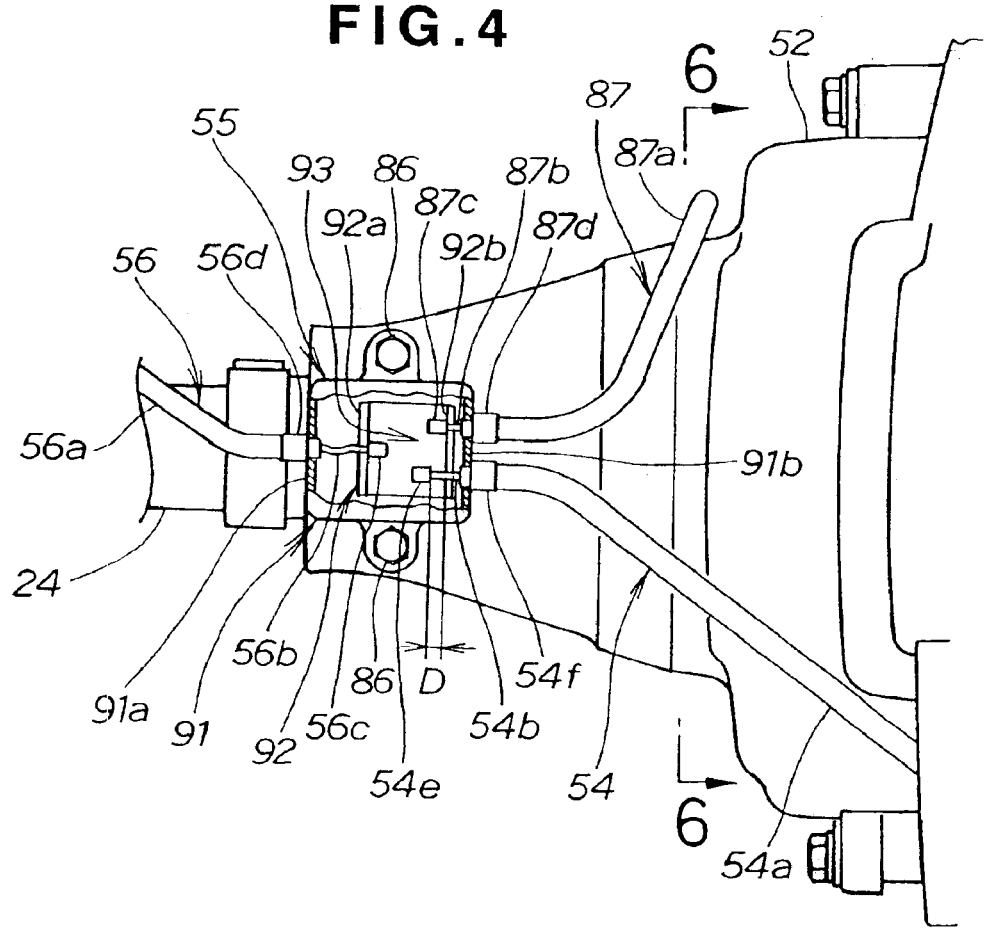
FIG. 4 is a top plan view illustrating the vicinity of a clutch case with a relay member shown in FIG. 2.

FIG. 4 shows the relay member 55 which serves as a link mechanism that interconnects the main cable 56, and the throttle cable 54 and the brake cable 87. The relay member 55 is mounted to an upper area of the clutch case 52 by bolts 86, 86. The main cable 56 is connected to one side, closer to the operation rod 24, of the relay member 55. The brake cable 87, which serves as the throttle cable 54 and a brake release cable, is connected to the other side, closer to the engine 21 (see FIG. 2), of the relay member 55.

The main cable 56 has a main wire 56b moveably inserted through a main tube 56a. The main wire 56b has a distal end formed with a main wire terminal member 56c. The main tube 56a has a distal end formed with a main tube terminal member 56d. An end portion of the main wire 56b protrudes outward from the main tube terminal member 56d.

The throttle wire 54b of the throttle cable 54 has a distal end formed with a throttle wire terminal member 54e. The throttle tube 54a has a distal end formed with a throttle tube terminal member 56f.

The brake cable 87 has a brake wire 87b moveably inserted through a brake tube 87a. The brake wire 87b has a distal end formed with a brake wire terminal member 87c. The brake tube 87a has a distal end formed with a brake tube terminal member 87d.

The relay member 55 includes a case 91, and a wire connecting member 92 received in the case 91. The main tube terminal member 56d is mounted to a side wall 91a, closer to the operation rod 24, of the case 91. The throttle tube terminal member 54f and the brake tube terminal member 87d are mounted to a side wall 91b, closer to the engine 21, of the case 91. The wire connecting member 92 has a U-shape configuration in cross section as shown in FIG. 2. The main wire terminal member 56c engages a first upright portion 92a, closer to the operation rod 24, of the wire connecting member 92. The throttle wire terminal member 54e and the brake wire terminal member 87c engage a second upright portion 92b, closer to the engine, of the wire connecting member 92.

As shown in FIG. 4, the amount of protrusion of the throttle wire 54b extending from the throttle tube 54 is settled to have a greater value than that of the brake wire 87b extending from the brake tube 87a. In addition, the brake wire terminal member 87c is brought into abutting engagement with the second upright portion 92b of the wire connecting member 92, letting the throttle wire terminal member 54e to be separated from the second upright portion 92b. Here, it is supposed that there is a difference D between the distance between the throttle wire terminal member 54e and the second upright portion 92b and the distance between the brake wire terminal member 87c and second upright portion 92b.

Thus, the presence of the relay member 55 of the preferred embodiment, with the throttle wire terminal member 54e which remains further away from the second upright portion 92b with respect to the brake wire terminal member 87c, allows a delay mechanism 93 to be provided for causing the throttle wire 54b to be pulled later than the brake wire 87b when the main wire 56b is pulled to shift the wire connecting member 92.

FIGS. 5A and 5B show outlines how the main cable 56, the throttle cable 54 and the brake cable 87 are coupled to the relay member discussed above.

First, in FIG. 5A, the main wire terminal member 56c is inserted through a through-bore 91c formed in one side wall 91a of the case 91 of the relay member until the main tube terminal member 56d is brought into abutting engagement with the one side wall 91a. Next, the throttle wire terminal member 54e is inserted through a through-bore 91d formed in the other side wall 91b of the case 91 of the relay member until the throttle tube terminal member 54f is brought into abutting engagement with the other side wall 91b. Further, the brake wire terminal member 87e is inserted through a through-bore 91e formed in the other side wall 91b of the case 91 of the relay member until the tube terminal member 87d is brought into abutting engagement with the other side wall 91b.

Subsequently, in FIG. 5B, the main wire 56b is inserted through a recess 92c formed in the first upright portion 92a, at one side, of the wire connecting member 92. The throttle wire 54b is inserted through a recess 92d formed in the second upright portion 92b, and the brake wire 87b is inserted through a recess 92e formed in the second upright portion 92b at the other side. And, in FIG. 4, fixing a lid over the case 91 completes an assembly of the relay member 55. Since the wire connecting member 92 is accommodated in the case 91 as shown in FIG. 2 not to move in upward or downward directions, the main wire 56b, the throttle wire 54b and the brake wire 87b are precluded from disengaging the recesses 92c, 92d and 92e formed in the wire connecting member 92 shown in FIG. 5B even during weed-cutting operation.

Figure 6:
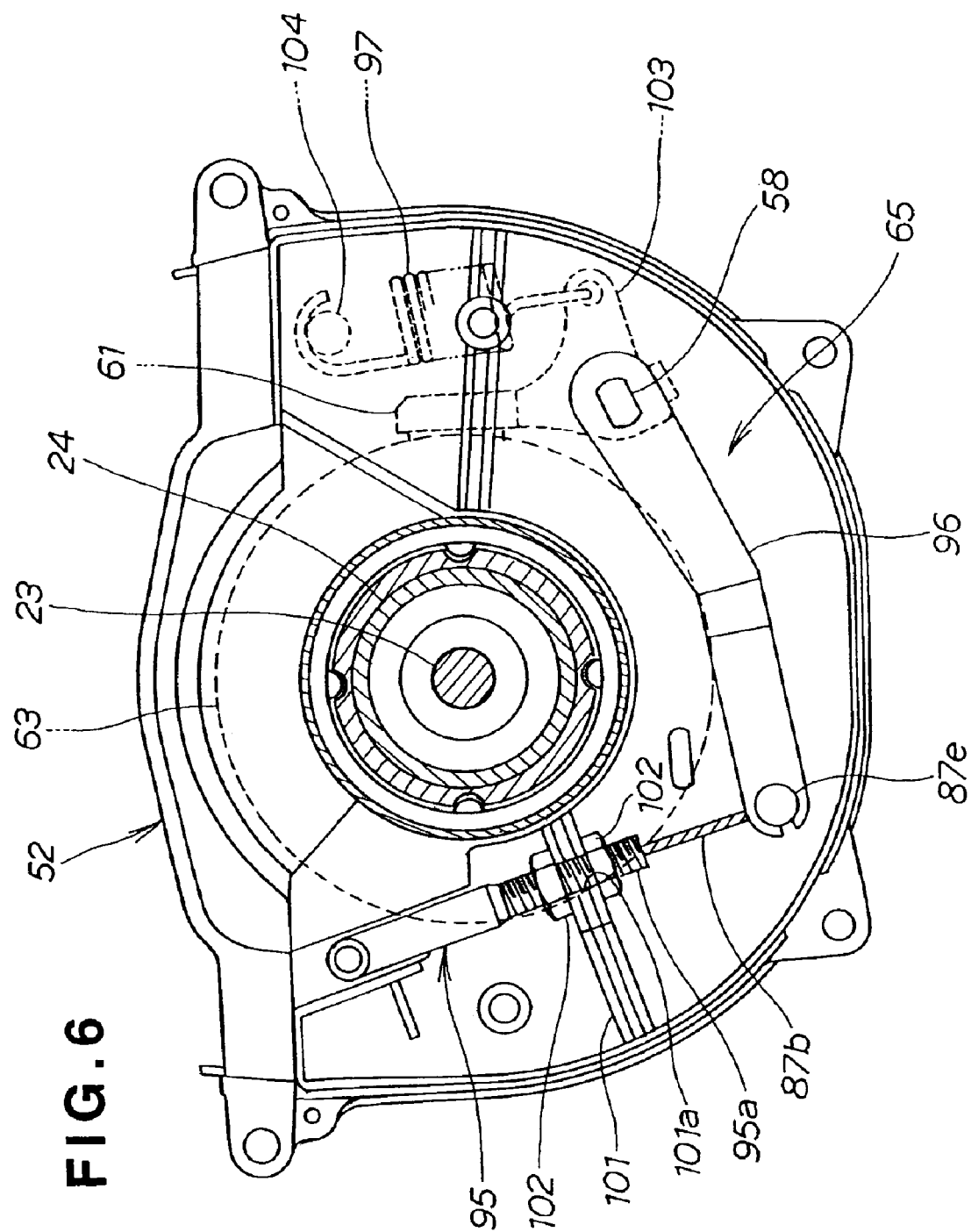
FIG. 6 is an enlarged cross sectional view taken along line 6—6 of FIG. 4, illustrating a brake unit.

FIG. 6 shows the brake unit 65. The brake unit 65 includes the brake cable 87 shown in FIG. 4, a cable fastening fixture 95 for fixedly securing a distal end of the brake tube 87a to the clutch case 52, a brake arm 96 connected to a distal end of the brake wire 87b protruding from a distal end of the cable fastening fixture 95, a pivot shaft 58 mounted to the brake arm 96, a brake shoe 61 mounted to the pivot shaft 58, the drum 63 adapted to be urged by the brake shoe 61 for applying a brake to the transmission shaft 23, and a tension coil spring 97 which urges the brake shoe 61 against the drum 63. The brake wire 87 is connected to the brake arm 96 via the wire terminal member 87e.

The brake shoe 61 shown in FIG. 6 remains in an urged state against the drum 63 due to the tension force of the tension coil spring 97, with the drum 63 being held in a braked condition.

The cable fastening fixture 95 has a distal end formed with a male thread portion 95a. Formed in the clutch case 52 is an upright wall 101 which has a recessed portion 101a. Inserting the male thread portion 95a into the recessed portion 101a and tightening nuts 102, 102 at both sides of the upright wall 101 cause the cable fastening fixture 95 to be fixed to the clutch case 52.

One end of the tension coil spring 97 is hooked to a spring hook portion 103, with the other end being hooked to a pin 104 fixed to the clutch case 52.

Although the cable fastening fixture 95 and the brake arm 96 a located outside the clutch case 52, these component parts are concealed with a case cover 105 shown in FIG. 2 to be precluded from being exposed to the outside.

Adjustment of the tension of the brake wire 87b is performed by loosening the nuts 102, 102 to move the cable fastening fixture 95 in an axial direction and subsequently tightening the nuts 102, 102.

Figure 7:
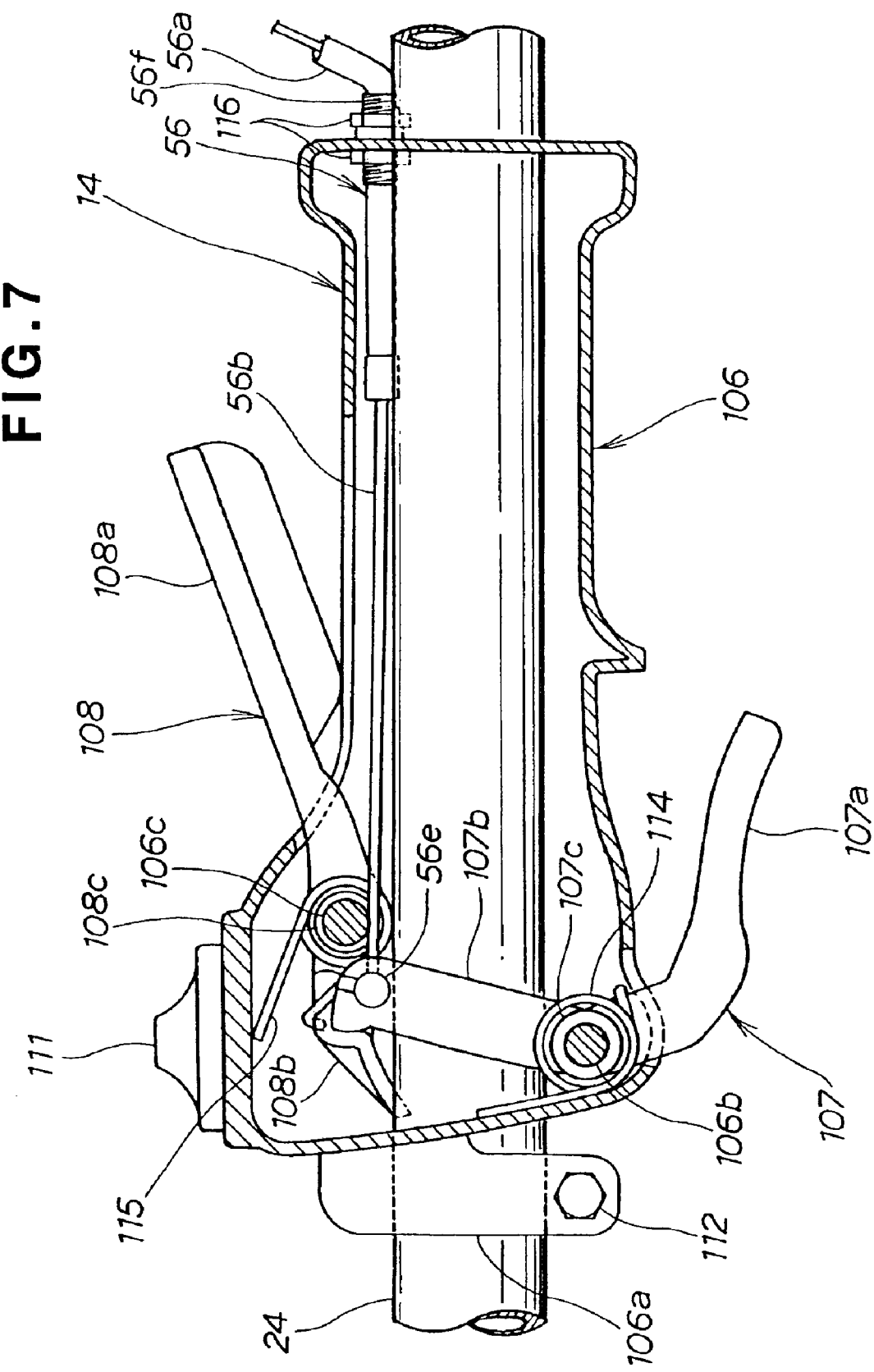
FIG. 7 is a cross sectional view illustrating details of an operating lever unit shown in FIG. 1.

FIG. 7 shows the operating lever unit 14. The operating lever unit includes a handle case 106, a throttle lever 107 swingably mounted to the handle case 106 for adjusting the rotational speed of the engine 21 shown in FIG. 2, a lock lever 108 swingably mounted to the handle case 106 for temporarily fixing the throttle lever 107, and a kill switch 111 for shutting off the operation of the engine 21.

The handle case 106 is composed of two case halves by which the operation rod 24 is sandwiched from its both sides.

One end of the handle case 106 has protruding segments 106a, 106a, protruding from the two case halves, respectively, which are tightened with a bolt 112, with the other end of the handle case 106 being fixedly secured to the operation rod 24 with tightened bolt (not shown).

The throttle lever 107 is comprised of an operating section 107a to allow a finger to engage therewith for operation, a wire arm connecting arm 107b connected to the main wire 56b of the main cable 56, and a bearing portion 107c which supports a pivot shaft 106b mounted to the handle case 106.

The lock lever 108 functions as a member to restrict the operation of the throttle lever 107 during braking operation of the cutter blade 22 at an idling condition of the engine 21 shown in FIG. 1. The lock lever 108 is comprised of a palm restraining portion 108a, an arm engagement portion 108b which is able to disengage from a distal end of the wire connecting arm 107b of the throttle lever 107, and a bearing portion 108c receiving a pivot shaft 106c mounted to the handle case 106.

Reference numeral 56e designates a wire terminal member fixed to a base end of the main wire 56b. Reference numeral 56f designates a case mount member secured to the main tube 56a for fixing a proximity base end of the main cable 56 to the handle case 106. Reference numeral 114 designates a twisted coil spring for urging the throttle lever 107 in a clockwise direction about the center of the pivot shaft 106b. Reference numeral 115 designates a twisted coil spring for urging the lock lever 108 in a counterclockwise direction about the center of the pivot shaft 106c.

Adjustment of the tension of the main wire 56b is performed by loosening the nuts 116, 116, screwed onto a male thread formed on the case mount member 56f to move the case mount member 56f in an axial direction by a given distance and subsequently tightening the nuts 116, 116.

Now, the operation of the bush cutting machine of the first preferred embodiment is described below with reference to FIGS. 8A to 13.

First, the engine is start up into an idling state. When this occurs, since the rotational speed of the engine is below the given value, the centrifugal clutch 51 remains in its off state as explained with reference to FIG. 2, and, also, the brake shoe 61 is held in pressured contact with the drum 63, rendering the cutter blade inoperative.

Figure 8A:
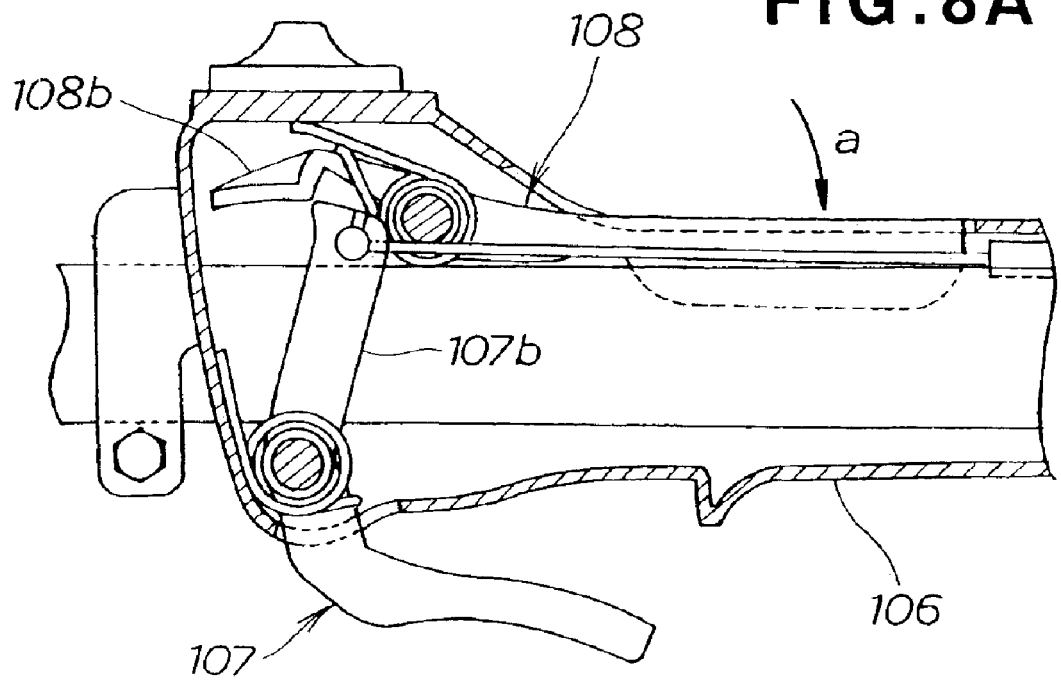
FIGS. 8A and 8B are views illustrating an operation of the operating lever unit shown in FIG. 7.

Under such an idling state, as shown in FIG. 8A, the lock lever 108 is pressed with the palm of the hand in a direction as shown by an arrow a while gripping the handle case 106. When this takes place, the arm engagement portion 108b of the lock lever 108 is brought out of engagement with the distal end of the wire connecting arm 107b of the throttle lever 107, thereby releasing the throttle lever 107 from its locked state. Consequently, the throttle lever 107 is rendered operative.

Figure 8B:
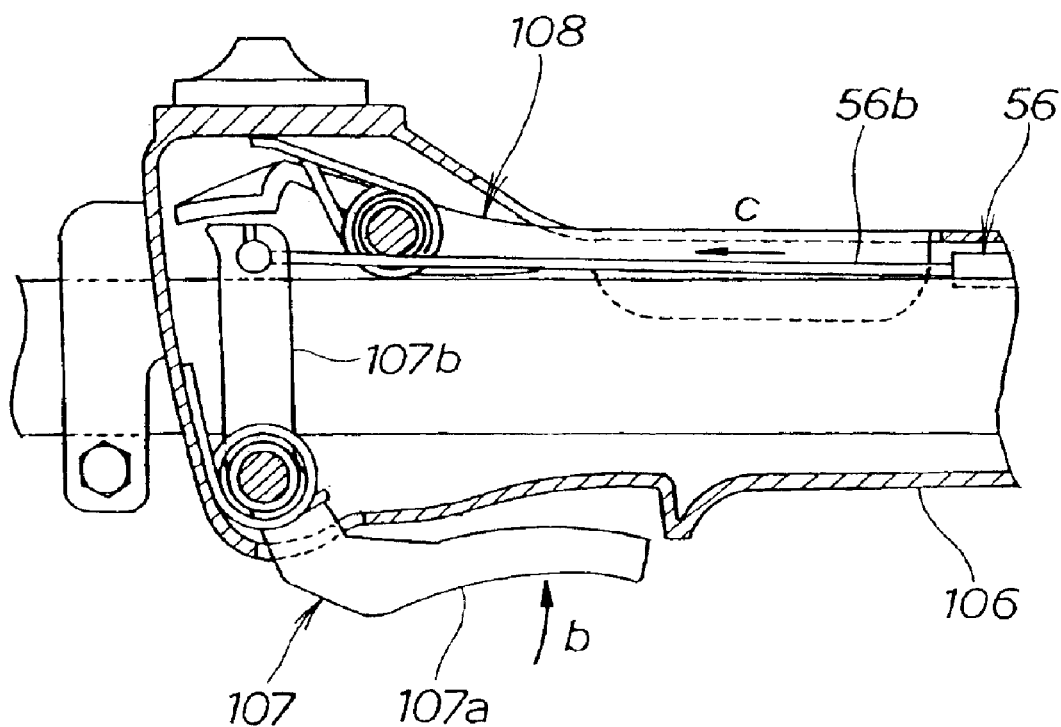

In FIG. 8B, manipulating the operating section 107a of the throttle lever 107 with the finger and rotating the throttle lever 107 to the halfway as shown by an arrow b cause the main wire 56b to be pulled in a direction as shown by an arrow c.

Figure 9:
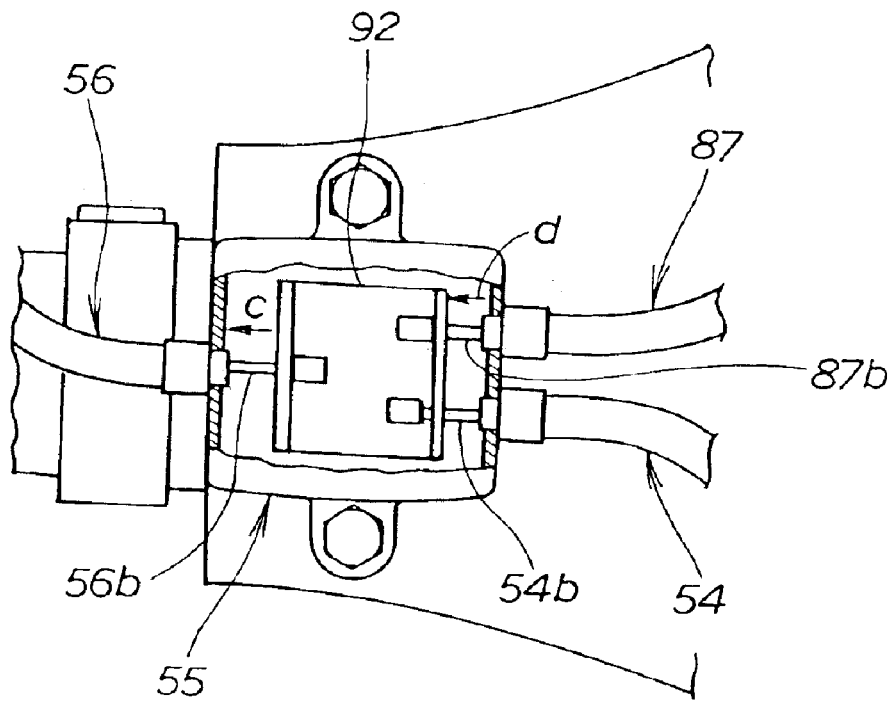
FIG. 9 is a schematic view illustrating an operation of the relay member with the throttle lever gripped and rotated an angle up to midway as shown in FIG. 8B.

When gripping the throttle lever 107 in such a manner described above, the main wire 56b is pulled in the direction as shown by the arrow c as viewed in FIG. 9, compelling the wire connecting member 92 to pull the brake wire 87b in a direction as shown by an arrow d concurrently with the movement of the main wire 56b.

Figure 10:
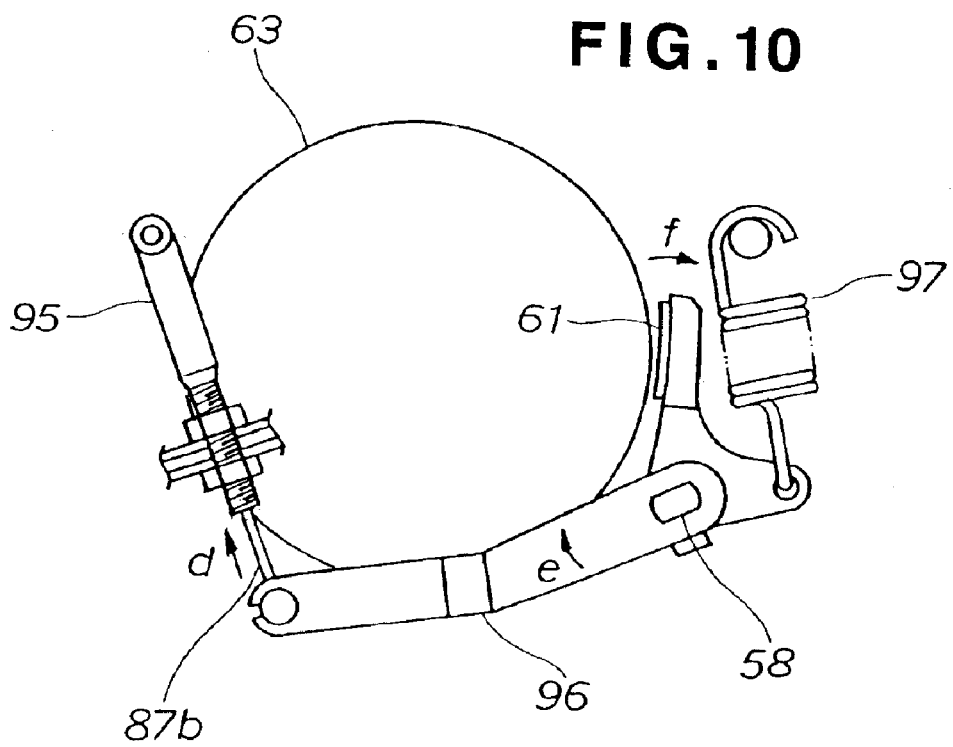
FIG. 10 is a schematic view illustrating an operational state wherein a brake shoe is removed from an outer periphery of a drum to unbrake by pulling a brake wire as shown in FIG. 9.

As the brake wire 87b is pulled in the direction as shown by the arrow d, the brake arm 96 is rotated in a direction as shown by an arrow e about the center of the pivot shaft 58 as shown in FIG. 10. When this occurs, the brake shoe 61, which is integral with the brake arm 96, is caused to swing in a direction as shown by an arrow f against the tension force of the tension coil spring 97, compelling the brake shoe 61 to disengage from the drum 63 for thereby releasing the brake effect.

Figure 11:
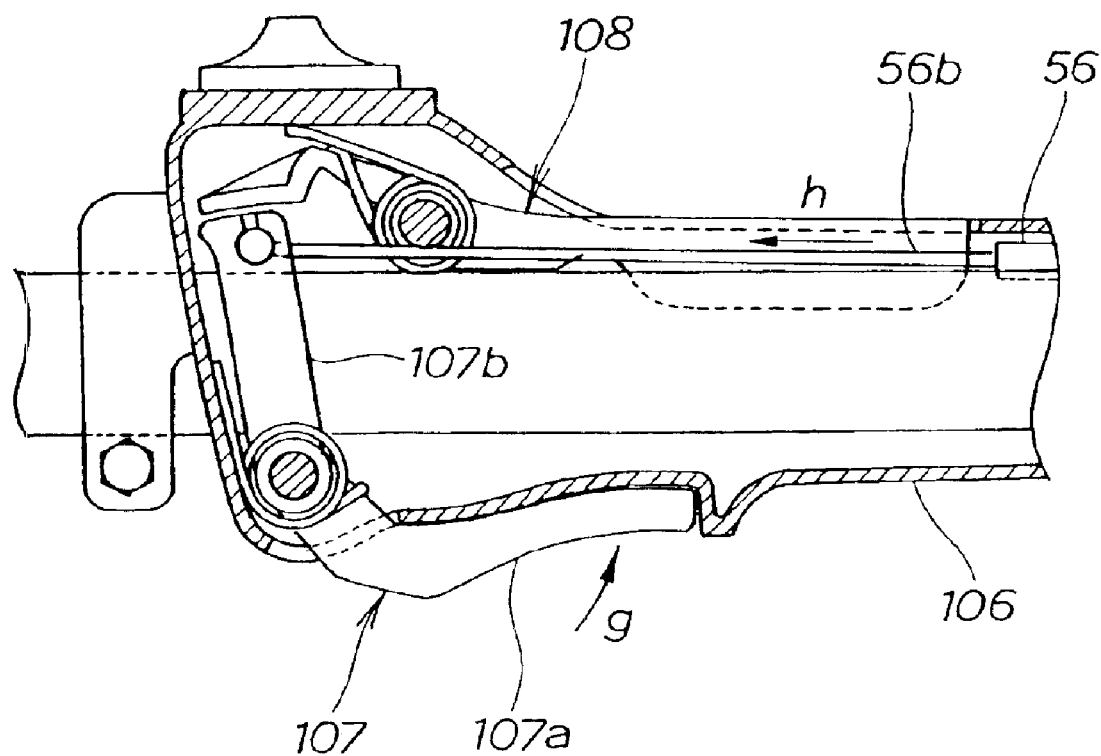
FIG. 11 is a view illustrating an operation of the operating lever unit with the throttle lever further deeply gripped from a state of FIG. 8B.

When gripping the throttle lever 107 further strongly in a direction as shown by an arrow g as shown in FIG. 11, the main wire 56b is further pulled in a direction of arrow h.

Figure 12:
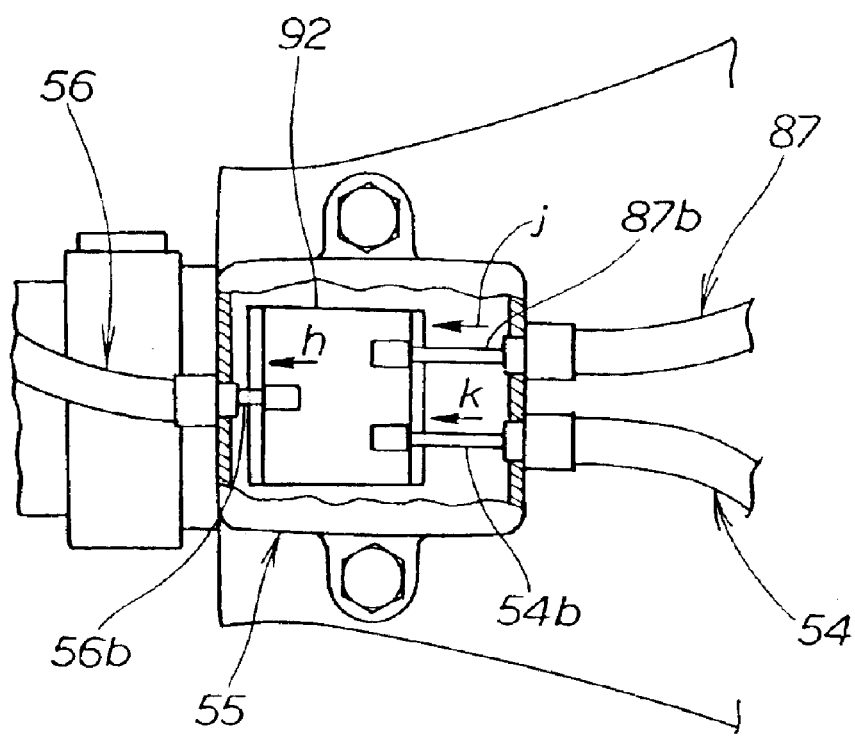
FIG. 12 is a view illustrating an operation of the relay member with the relay member further moved from the position of FIG. 9 to cause the throttle wire to be pulled.

In FIG. 12, when the main wire 56b is further pulled in the direction as shown by the arrow h, the brake wire 87b is further pulled in a direction as shown by an arrow j via the wire connecting member 92 and, at the same time, the throttle wire 54b, which is not yet pulled as viewed in FIG. 9, is initiated to be pulled in a direction as shown by arrow k.

Figure 13:
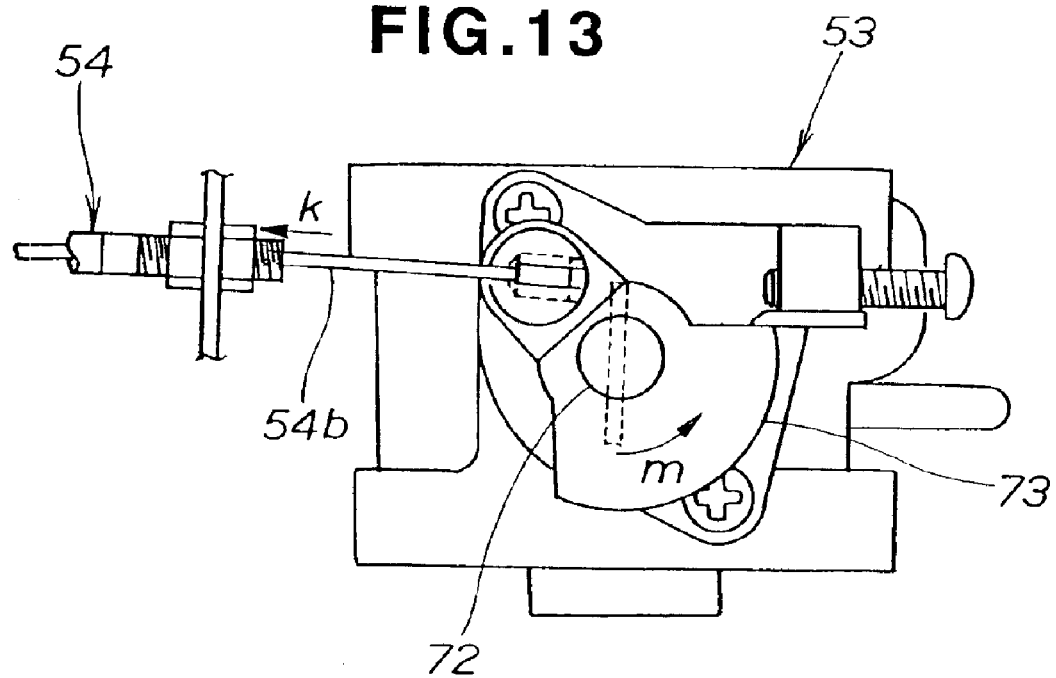
FIG. 13 is a view illustrating an operation wherein the throttle wire is pulled to rotate the throttle arm to cause a throttle valve to be brought into an open condition.

In FIG. 13, as the throttle wire 54b is pulled in the direction as shown by the arrow k, the throttle arm 73 of the carburetor 53 is rotated in a direction as shown by an arrow m about the center of the throttle shaft 72.

As a consequence, the throttle valve 72a mounted to the throttle shaft 72 is brought into an open state, with a resultant increase in the volume of air and fuel to be supplied to the engine to increase the engine speed. As the engine speed exceeds the given value, in FIG. 2, the centrifugal clutch 51 is coupled to transmit drive power from the engine 21 to the cutter blade which in turn is rotated.

As described above with reference to FIGS. 3 and 4, FIGS. 5A and 5B and FIG. 6, the first preferred embodiment of the present invention firstly features the provision of the bush cutting machine, having the throttle lever 107 for adjusting the opening degree of the throttle valve 72a of the engine 21 shown in FIG. 1 and the brake unit 65 for braking the rotation of the cutter blade 22 driven with the engine 21, which includes the main cable 56 connected at the one end with the throttle lever 107, the relay member 55 serving as the link mechanism interconnected with the other end of the main cable 56 and mounted to the clutch case 52 located in close proximity to the engine 21, the throttle cable 54 connected between the relay member 55 and the throttle arm 73 mounted to the throttle shaft 72 of the throttle valve 72a, and the brake cable 87 connected between the relay ember 55 and the brake arm 96 which releases the operation of the brake unit 65.

Operating the throttle lever 107 enables the opening degree of the throttle valve 72a to be adjusted and the brake unit to be actuated or released, with a resultant improvement in operability and workability of the bush cutting machine.

Also, since the relay member 55 is mounted to the clutch case 52 disposed adjacent the engine 21, for example, when assembling the throttle lever 107 to the handle 16 shown in FIG. 1, a single piece of main cable 56 should be merely located between the handle 16 and the relay member 55 close to the engine 21, enabling a structure around the handle 16 to be simplified in construction while enabling the operability of the bush cutting machine 11 to be highly improved.

As described above with reference to FIG. 4, the first preferred embodiment of the present invention secondly concerns the presence of the relay member 55 which includes the delay mechanism 93 which is arranged to cause the throttle wire 54b to be delayed in movement from that of the brake inner wire 87b when operating the throttle lever 107, shown in FIG. 6, to pull the main wire 56b. As a result, operating the throttle lever 107 enables the brake unit 65, shown in FIG. 6, to be actuated or released and the opening degree of the throttle valve 72a, shown in FIG. 3, to be adjusted in a sequence of movements in a smooth fashion. Since, further, the relay member 55 is composed of a minimum number of component parts which are simple in structure, an assembling efficiency is highly improved in a reduced cost.

Now, a bush cutting machine according to a second preferred embodiment of the present invention is described below. Also, the same components parts as those used in the first embodiment bear the same reference numerals as those used therein and a description of these component parts is herein omitted. The bush cutting machine of the second preferred embodiment has no relay member, serving as the link mechanism, which has been shown in the first preferred embodiment with reference to FIGS. 2 and 4.

The throttle cable 254 shown in FIG. 14 extends between the operating lever unit 14 shown in FIG. 1 and the brake unit which will be described later. The throttle cable 25 is connected at its midway to the carburetor 53 mounted at the side area of the engine 21.

Figure 15:
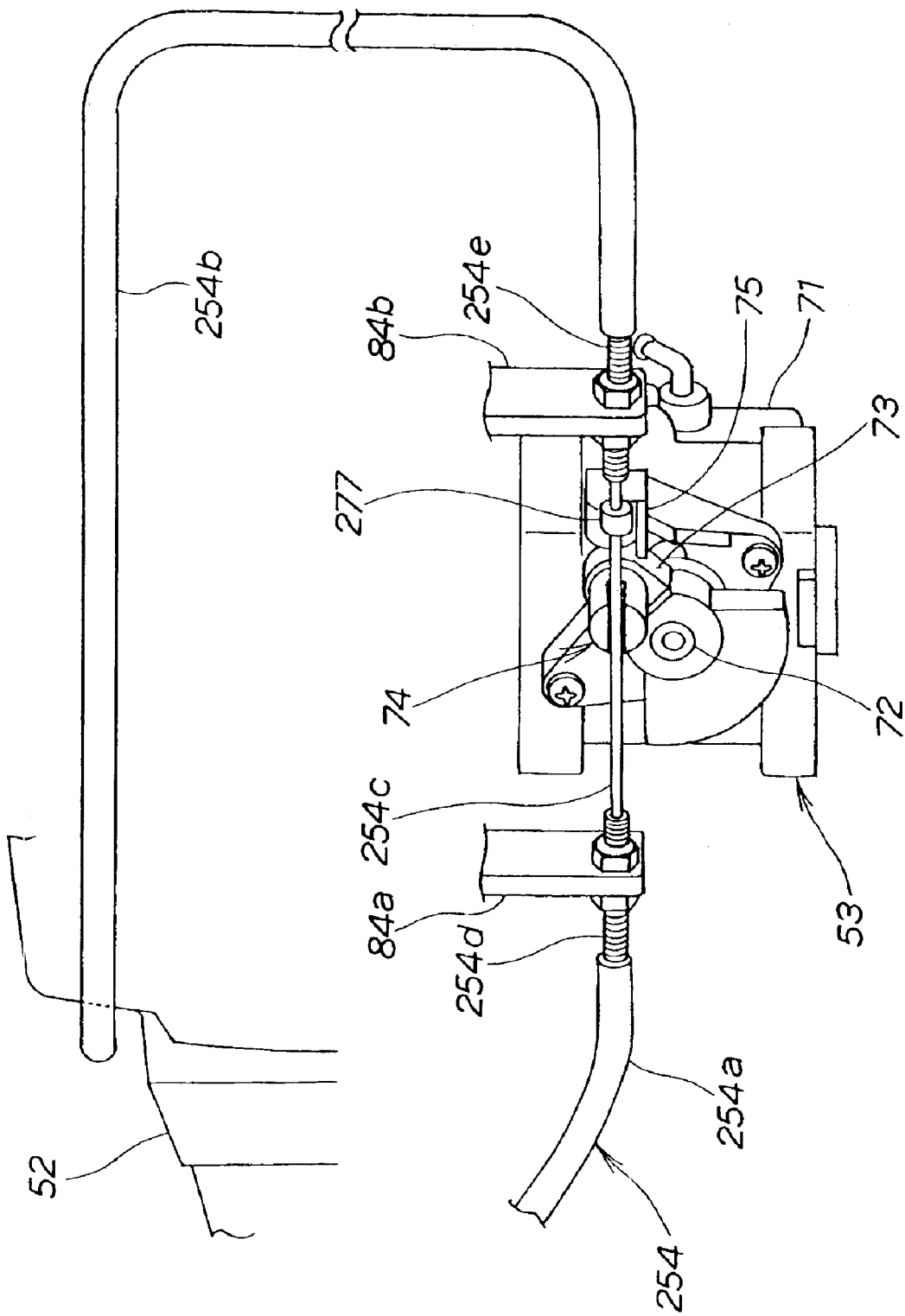
FIG. 15 is a view illustrating a relationship between the throttle cable and the carburetor as viewed in the direction of arrow 15 of FIG. 14.
Figure 16:
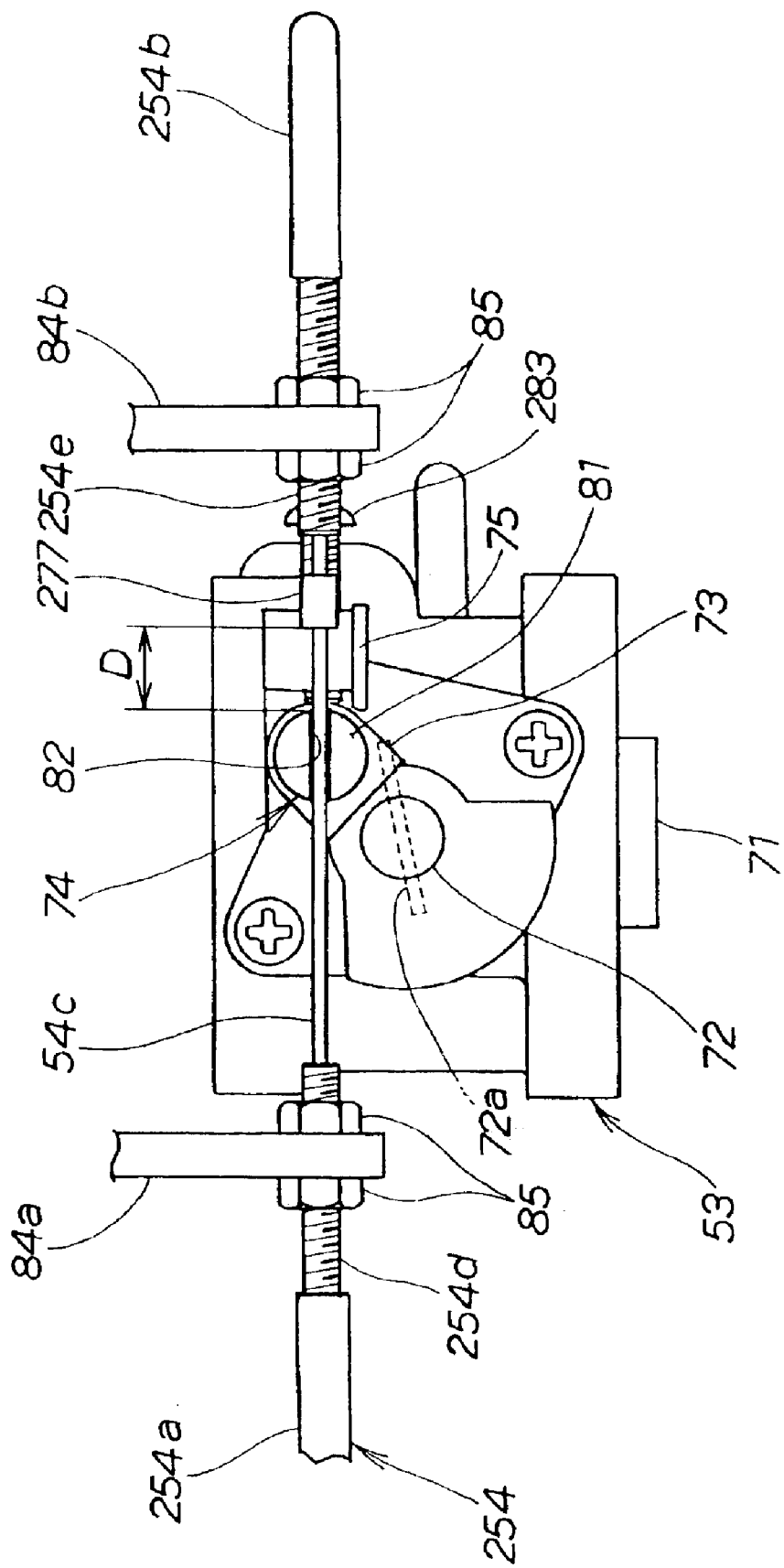
FIG. 16 is a view illustrating a relationship between the throttle cable and the carburetor as viewed in the direction of arrow 16 of FIG. 14.

The connection between the throttle cable 254 and the carburetor 53 is shown in FIGS. 15 and 16.

Referring to FIG. 15, the throttle cable 254 is shown having a first throttle tube 254a, a second throttle tube 254b, a throttle wire 254c and a throttle-arm actuating member 277. One end of the first throttle tube 254a is connected to the operating lever unit 14 shown in FIG. 1, and the other end is connected to a first bracket 84a extending from an external wall of the engine 21 shown in FIG. 14. One end of the throttle tube 254b is connected to a second bracket 64b extending from the external wall of the engine 21, and the other end extends around the upper area of the engine 21 and is connected to the brake unit 65. The throttle wire 254c is moveably inserted through the first and second throttle tubes 254a, 254b. One end of the throttle wire 254c is connected to the operating lever unit 14, and the other end is connected to the brake unit 65. The throttle-arm actuating member 277 is disposed in the midway of the throttle wire 254c and has an expanded portion which is larger in diameter than the throttle wire 254c.

Reference numeral 254d designates a first tube terminal member disposed at the other end of the first throttle tube 254a, and reference numeral 254e designates a second tube terminal member disposed at the one end of the second throttle tube 254b.

In FIG. 16, the wire mount portion 74 has an upper surface 81 formed with the transverse recess 82. The traverse recess 82 has a width slightly larger in size than the diameter of the throttle wire 254c. The throttle wire 254c is moveably disposed in the transverse recess 82 along the longitudinal direction thereof.

The throttle-arm actuating member 277 is located at a position displaced from the wire mount portion 74 by a distance D and closer to the second tube terminal member 254e. Reference numeral 283 designates an adjusting nut which is brought into abutting engagement with the throttle arm 73 for adjustably rotating the throttle arm 73 with a view to adjusting the fully closed position of the throttle valve.

Figure 17:
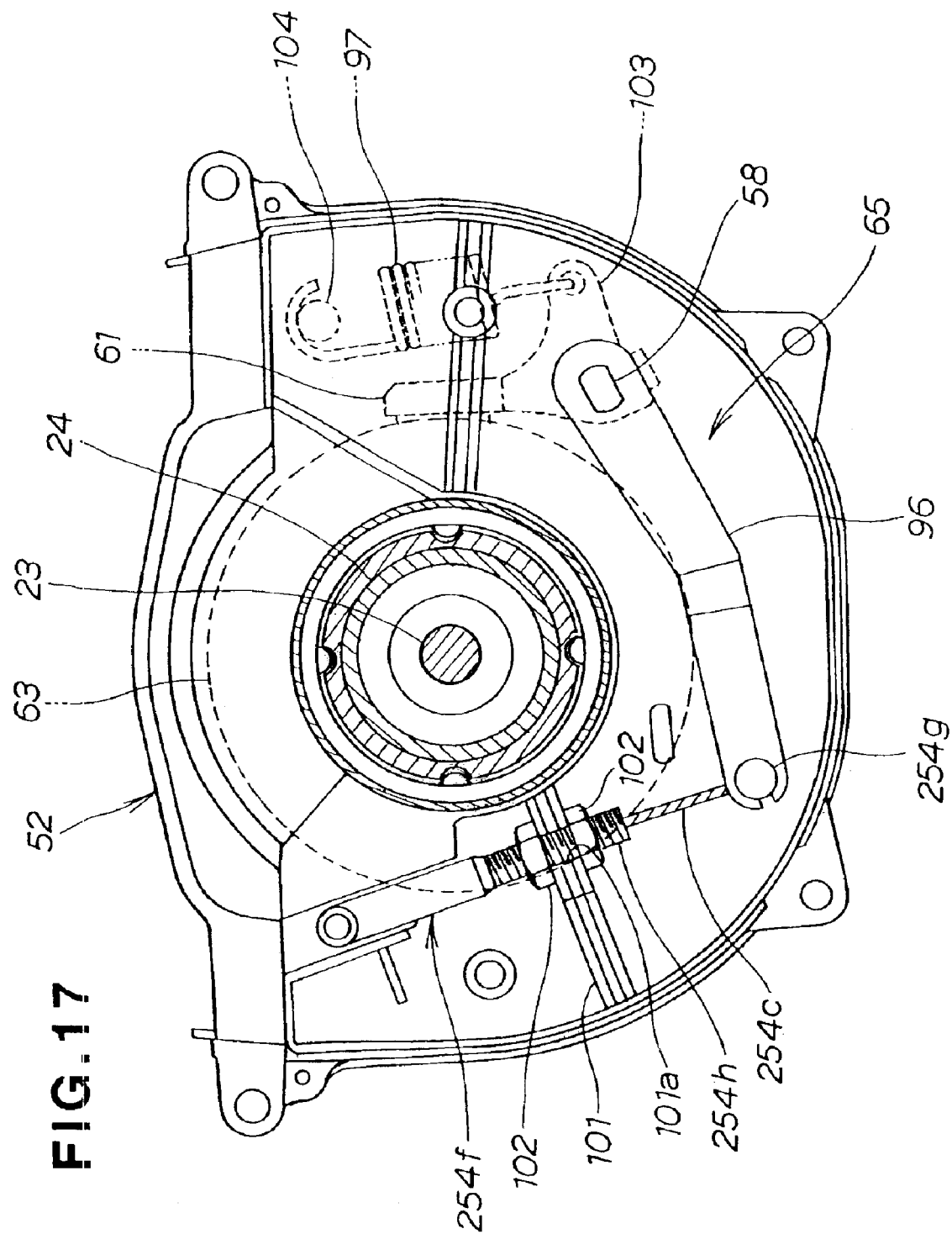
FIG. 17 is a partial cross sectional view taken along line 17—17 of FIG. 14, illustrating a relationship between the throttle wire and the brake unit.

FIG. 17 shows a brake unit of a bush cutting machine of a second preferred embodiment. The brake unit 65 has at its one end a brake arm 96. The other end of the throttle wire 254 is connected to the other end of the brake arm 96 via the first wire terminal member 254g disposed at the distal end of the throttle wire 254. The brake shoe 61 is mounted to the pivot shaft 58. Urging the brake shoe 61 against the drum 63 applies the brake to the rotation of the transmission shaft 23. The tension coil spring 97 urges the brake shoe 61 against the drum 63 at all times. Reference numeral 254f is a third tube terminal member fixed to the end of the second throttle tube 254b shown in FIG. 15 for mounting the throttle cable 254 to the clutch case 52. The third tube terminal member 254f has a distal end formed with a male thread portion 254h.

The operating lever unit 14 of the bush cutting machine according to the second preferred embodiment has the same structure as that shown in FIG. 7 as the first preferred embodiment, and the throttle lever 107 and the lock lever 108 operate in the same manner as those shown in FIGS. 8A and 8B. For this reason, a description of the operating lever unit 14 of the second preferred embodiment is omitted.

Figure 18A:
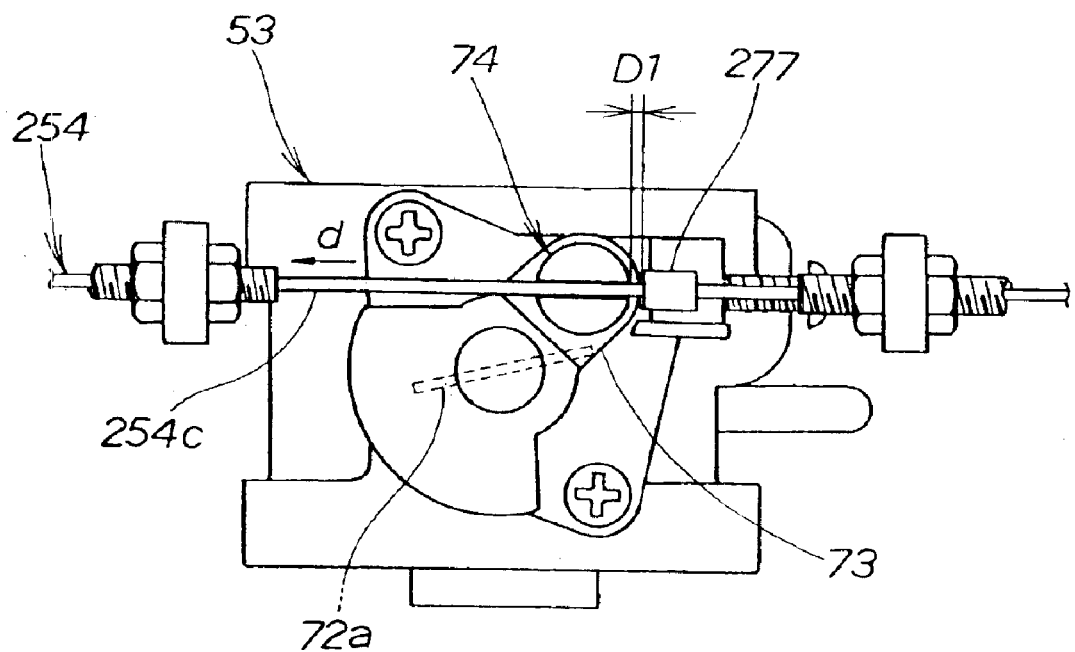
FIG. 18A is a view illustrating a relationship between the throttle wire and the throttle arm upon gripping movement of the throttle lever up to midway to pull the throttle wire.

In FIG. 18A, when pulling the throttle wire 254c of the throttle cable 254 in the direction as shown by the arrow d, the throttle-arm actuating member 277, disposed at the midway of the throttle wire 254c, moves with the throttle wire 254c toward the wire mount portion 74 of the throttle arm 73. When this occurs, since the throttle-arm actuating member 277 and the wire mount portion 74 are still spaced from one another by the distance D1, the wire mount portion 74 remains stationary and the throttle valve 72a remains in a substantially closed condition.

Figure 18B:
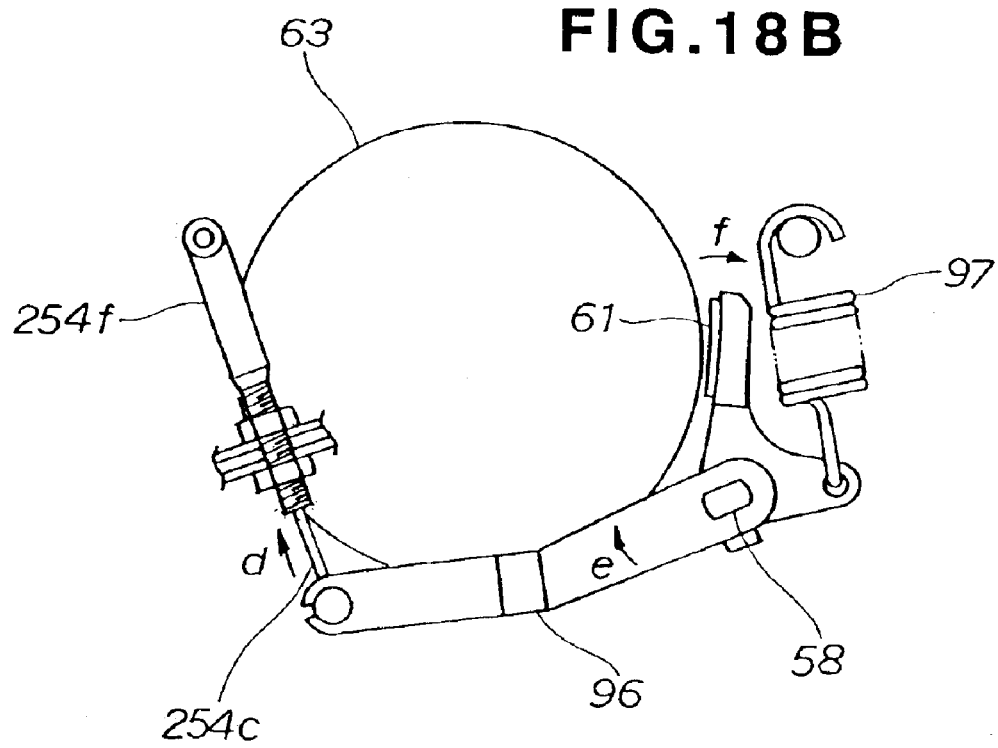
FIG. 18B is a view illustrating the movement of the brake unit in such relationship.

In FIG. 18B, when pulling the throttle wire 254c in the direction as shown by the arrow d as described with reference to FIG. 18A, the brake arm 96 rotates clockwise about the center of the pivot shaft 58 as shown by the arrow e. Since the brake unit 61 is integral with the brake arm 96, the brake shoe 61 rotates against the force of the tension coil spring 97 in the same direction as the brake arm 96 and is displaced from the drum 63 to be brought into the brake-released condition.

Figure 19:
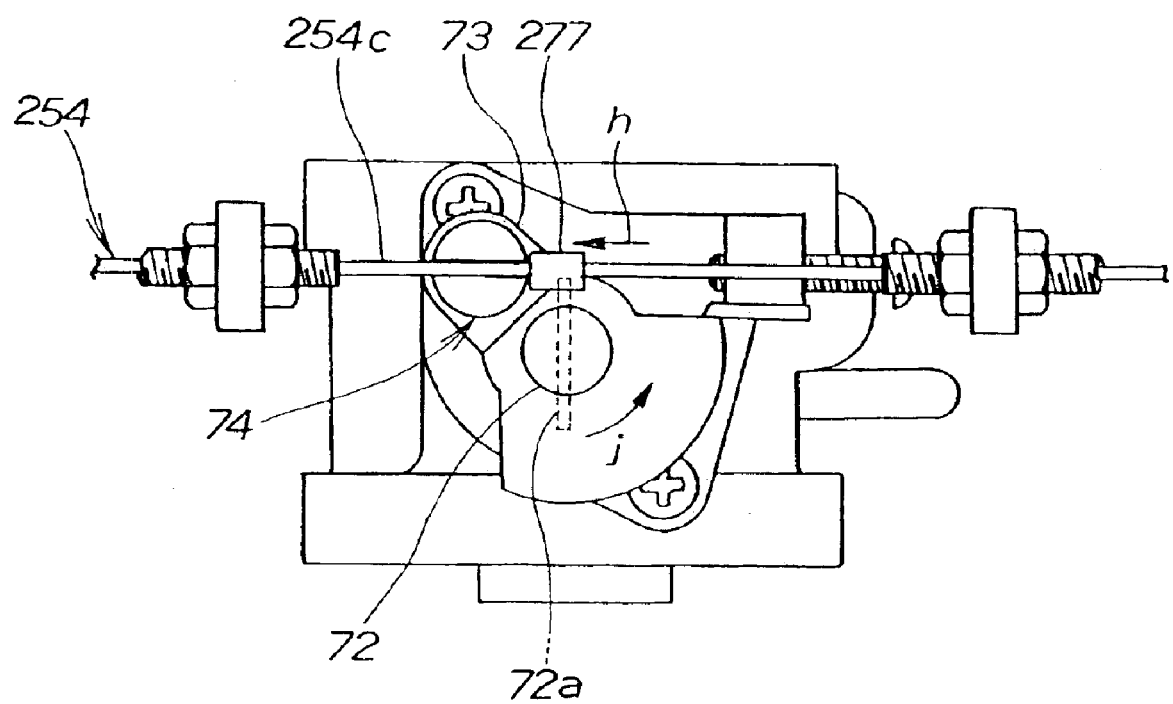
FIG. 19 is a view illustrating a condition wherein the throttle valve is opened by the throttle wire when the throttle lever is fully gripped.

Like in the first preferred embodiment shown in FIG. 11, when fully gripping the throttle lever 107 and pulling the throttle wire 254c in the direction as shown by the arrow h in FIG. 11, the throttle-arm actuating member 277 is brought into abutting contact with the wire mount portion 74 as shown in FIG. 19. When this takes place, the throttle arm 73 rotates counterclockwise about the center of the throttle shaft 72 as shown by the arrow j, thereby rendering the throttle valve 72a, mounted to the throttle shaft 72, to be brought into an open condition. This causes the amount of intake air and fuel to increase, with a resultant increase in the engine speed. When the engine speed exceeds the given value, in FIG. 14, the centrifugal clutch 51 is coupled such that the drive power is transmitted from the engine 21 to the cutter blade which is consequently rotated.

As described above with reference to FIGS. 14, 16 and 17, the bush cutting machine according to the second preferred embodiment features the provision of the throttle lever 107 for adjusting the opening degree of the throttle valve 72a of the engine and the brake unit 65 which applies the brake to the rotation of the cutter blade 22, shown in FIG. 1, which is driven with the engine 21, with the end of the throttle cable 254 being connected to the throttle lever 107 while the other end of the throttle cable 254 is coupled to the brake arm 96 for releasing the brake or applying the brake with the brake unit 65 and with the throttle-arm actuating member 277 being disposed at the midway of the throttle cable 254 to act as the link mechanism for rotating the throttle arm 73 to open or close the throttle valve 72a when operating the throttle valve 107.

Thus, the presence of the single piece of throttle cable 254 acting to perform both the operation of the brake unit 65 and the operation of the throttle valve 72a enables the number of cables to be reduced for thereby reducing the cost of the component parts.

Further, according to the second preferred embodiment, a single piece of throttle cable 254 may be located between the handle 16 and the engine 21 shown in FIG. 1, with a structure around the handle 16 being simplified while improving the operability of the bush cutting machine 11.

With such a bush cutting machine according to the second preferred embodiment, the throttle-arm actuating member 277 is located near the brake unit and spaced from the throttle arm 73 by the distance D, providing the delay function to achieve the opening and closing operations of the throttle valve 72a with a delay in timing from the releasing operation of the brake unit 65. That is, when pulling the throttle cable 254 by operating the throttle lever 107, first, the brake arm 96 is actuated to release the brake unit 65 and, then, the throttle-arm actuating member 277 is brought into abutting contact with the throttle arm 73 to compel these to be interlinked to one another, thereby providing an ability for achieving the opening movement of the throttle valve 72a with a time delay from the releasing operation of the brake.

Also, when letting the throttle cable 254 to be returned, on the contrary, the brake operation is performed after the closing movement of the throttle valve 72a, resulting in a capability of smoothly carrying out both the releasing operation of the brake or applying the brake and the adjusting operation for the opening degree of the throttle valve 72a in a sequence of operation of the throttle lever 107.

Figure 20:
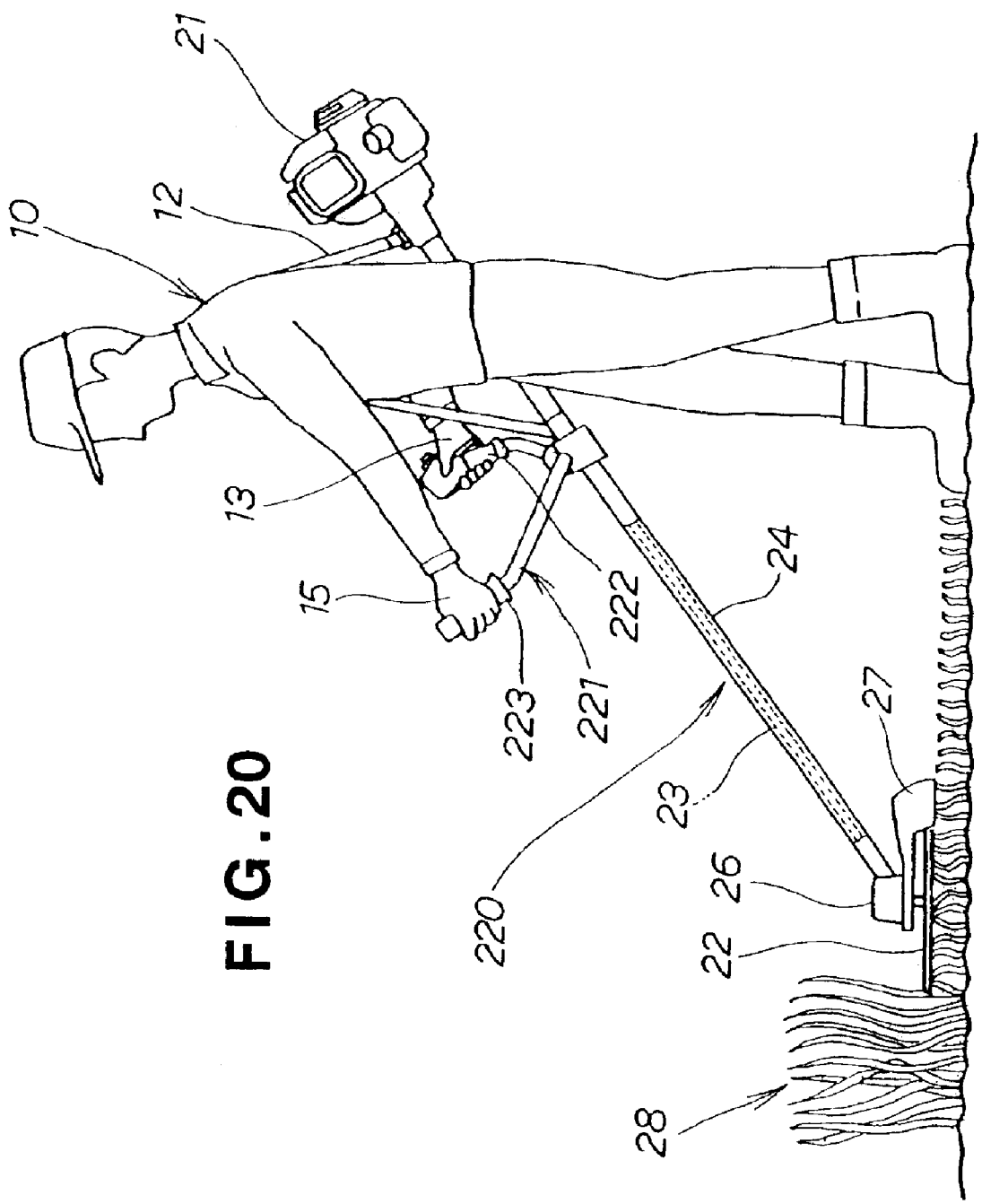
FIG. 20 is a modified form of the bush cutting machine according to the first and second embodiments, which has an operation rod with a U-shaped handle and an operating lever unit mounted to the grip of the handle.
Figure 21:
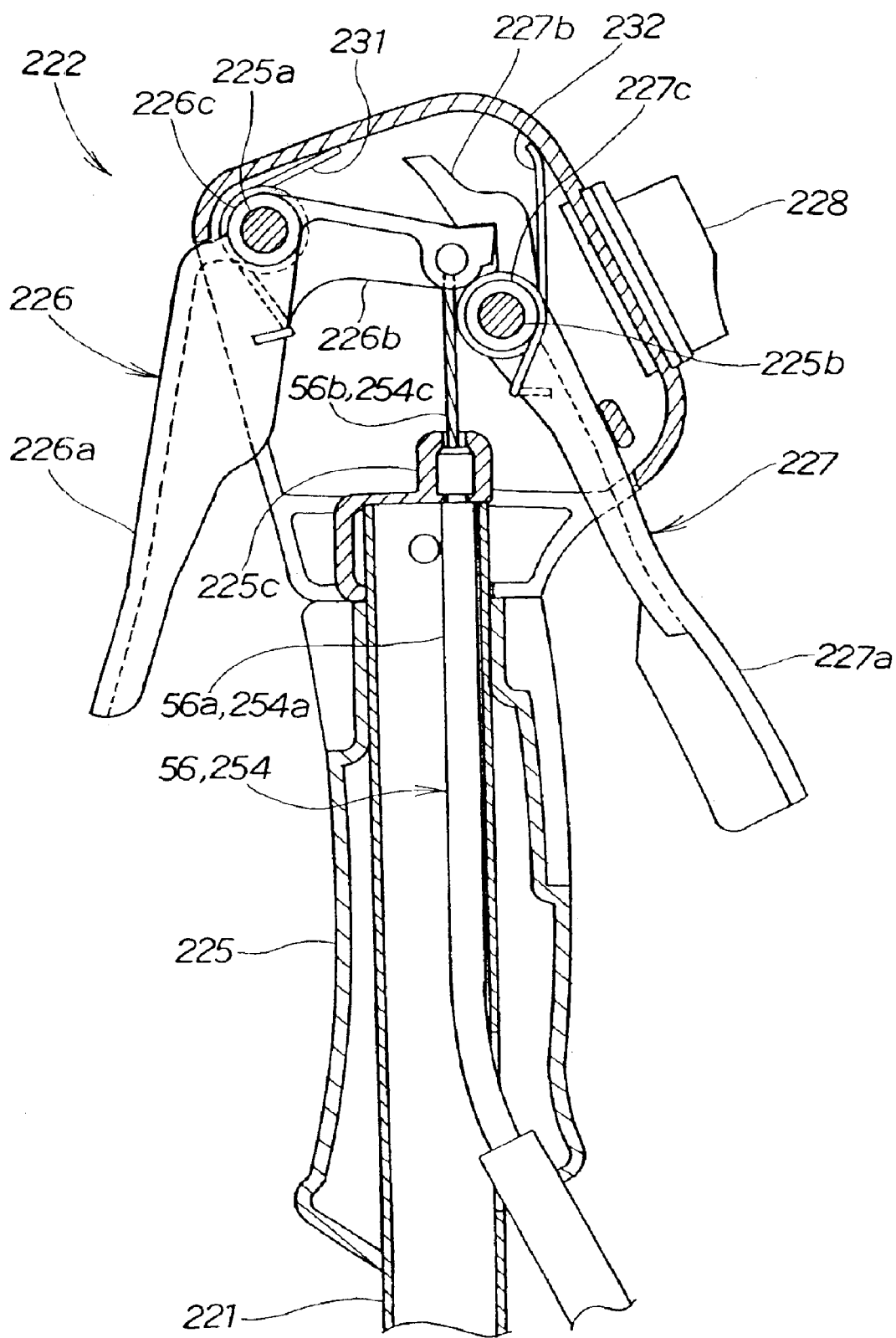
FIG. 21 is an enlarged cross sectional view of the operating lever unit shown in FIG. 20.

FIGS. 20 and 21 show a modified form of the first and second preferred embodiments wherein a bush cutting machine 120 of the modified form, as shown in FIG. 20, has the operation rod 24 mounted with a U-shaped handle 221 whose right handle component is mounted with an operating lever unit 222 while a left handle component is mounted with a grip 223. When in use, the operator 10 grips and operates the operating lever unit 222 with right hand 13 while holding the grip 223 with left hand 15. Other component parts are similar to those shown in FIG. 1 and a description of the same is omitted.

FIG. 21 shows the operating lever unit 222, mounted to the right handle component shown in FIG. 20, in cross section.

The operating lever unit 222 according to the modified form shown in FIG. 21 includes a handle case 225, a throttle lever 226 swingably mounted to the handle case 222 for adjusting the rotational speed of the engine 21 shown in FIG. 20, a lock lever 227 swingably mounted to the handle case 225 for temporarily fixing the throttle lever 226, and a kill switch 228 for stopping the engine 21.

The handle case 225 is comprised of two case halves, which are fixed to the handle 221 with screws which are not shown.

The throttle lever 226 is comprised of an operating section 226a, a wire arm connecting arm 226b connected to the main wire 56b of the main cable 56 or the throttle wire 254c of the throttle cable 254, and a bearing portion 226c which supports a pivot shaft 225a mounted to the handle case 225.

The lock lever 227 is comprised of a pressure section 227a which is pressed with the palm of the hand, an arm engagement segment 227b which engages or disengages from the wire connecting arm 226b of the throttle lever 226, and a bearing portion 227c which supports a pivot shaft 225b mounted to the handle case 225.

The throttle lever 226 and the lock lever 227 operate in the same manner as the throttle lever 10 and the lock lever 108 shown in FIG. 7 and FIGS. 8A and 8B in conjunction with the first preferred embodiment and detailed description of the same is herein omitted.

Reference numeral 225c designates a tube mount portion formed in the handle case 225 for mounting a distal end of the main tube 56a of the main cable 56, or a distal end of the throttle tube 254a of the throttle cable 254 to the handle case 225. Reference numeral 231 designates a twisted coil spring which urges the throttle lever 226 such that the throttle lever 226 can be rotated clockwise about the center of the pivot shaft 225a. Reference numeral 232 designates a twisted coil spring which urges the lock lever 227 such that the lock lever 227 can be rotated counterclockwise about the center of the pivot shaft 225b.

Now, a bush cutting machine of a third preferred embodiment is described below. The bush cutting machine according the third preferred embodiment features the provision of a link mechanism composed of a relay member, described in conjunction with the first preferred embodiment, which is located in the operating lever unit 222 which acts as one of the grips of the U-shaped handle 221 shown in FIG. 20. A description is given below about an operating lever unit 222, which acts as one of the grips of the U-shaped handle 221 shown in FIG. 20, a throttle actuating mechanism and a brake unit with reference to FIGS. 22 to 31. Also, the same component parts as those of the bush cutting machine shown in the first preferred embodiment bear the same reference numerals and a detailed description of the same is herein omitted.

Figure 22:
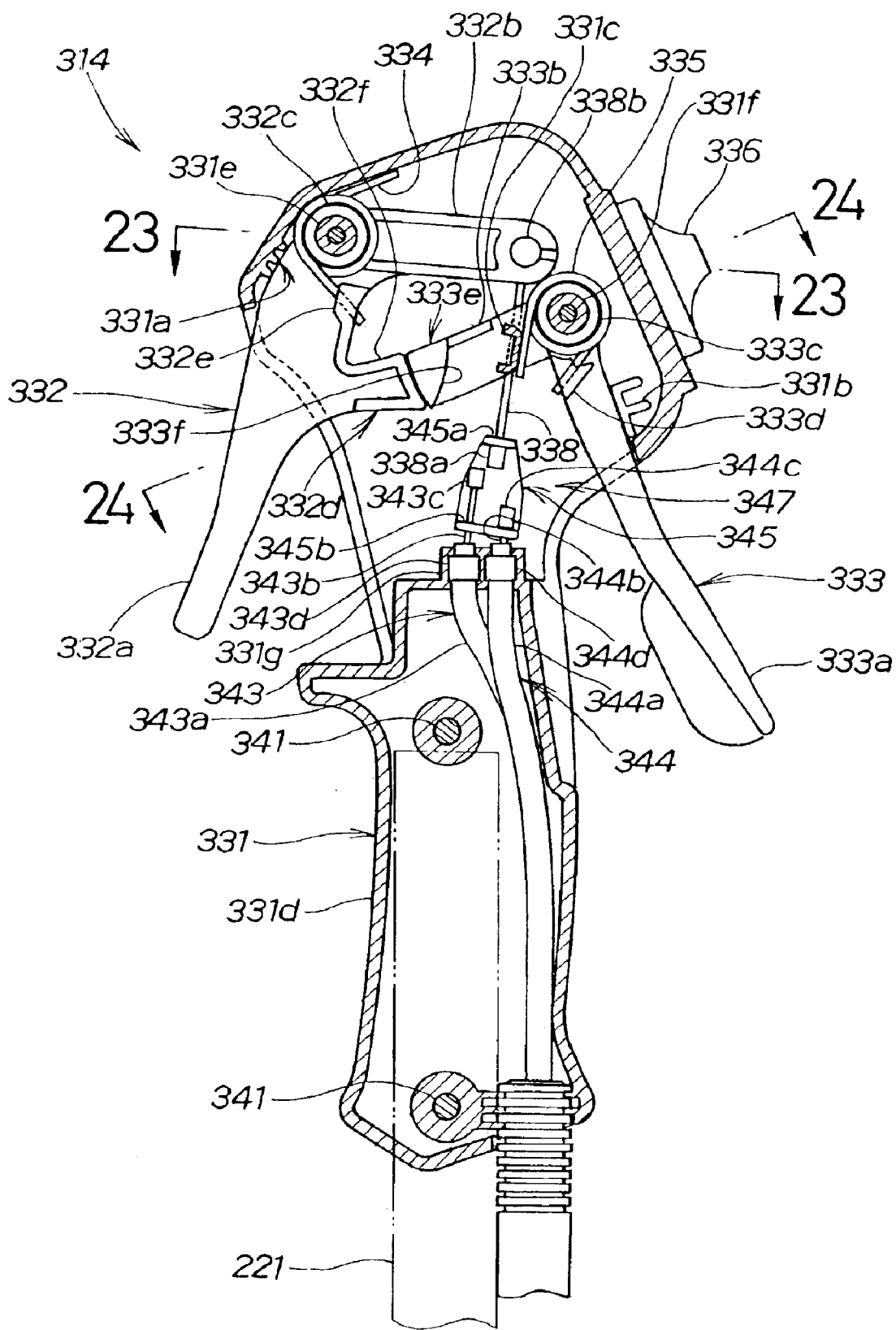
FIG. 22 is a cross sectional view of the operating lever unit employed in a bush cutting machine according to a third embodiment, as one of grids of the handle shown in FIG. 20, illustrating a relay member serving as a link mechanism housed in the operating lever unit.

Referring now to FIG. 22, the operating lever unit 314 includes a handle case 331, a throttle lever 332 swingably mounted to the handle case 331 for adjusting the rotational speed of the engine shown in FIG. 20, a lock lever 333 swingably mounted to the handle case 331 for locking the swinging movement of the throttle lever 332, a twisted coil spring 334 which provides a rotational force to the throttle lever 332 in a clockwise direction, a twisted coil spring 335 for applying a rotational force to the lock lever in a counterclockwise direction, and a kill switch 336 for stopping the engine 21.

The handle case 331 is comprised of two case halves by which the handle 221 shown in FIG. 20 is sandwiched, with two case halves being fixed to the handle 221 by screws which are not shown. Further, the handle case 331 includes a throttle lever stopper segment 331a for restricting the clockwise swinging movement of the throttle lever 332, a lock lever stopper segment 331b for restricting a counterclockwise swinging movement of the lock lever 333, a spring hook portion 331c engaging one end of a twisted coil spring 335, and a grip portion 331d which is gripped with the hand.

The throttle lever 332 is comprised of an operating section 332a with which fingers (for, example, a forefinger, a middle finger, etc.) are hooked, a wire connecting arm 332b connected to a main wire 338, a bearing portion 332c, a projecting portion 332d which protrudes toward the lock lever 333, and a spring inserting portion 332e which allows one end of a twisted coil spring 334 to be inserted. Also, reference numeral 332f designates a side wall of the projecting portion 332d.

The lock lever 333 is comprised of a swing stopper arm 333b for restricting the swinging movement of the throttle lever 332 by compelling at to move toward the projecting portion 332d of the throttle lever 332, a bearing portion 333c which supports a pivot shaft 331f mounted to the handle case 331, and a spring inserting portion 333d through which the other end of the twisted coil spring 335 is inserted. Also, reference numeral 333e designates a sidewise protrusion which protrudes from an end portion of the stopper arm 333b toward a side thereof (corresponding to the front surface of the drawing), and reference numeral 333f designates a circular arc wall of the sidewise protrusion 333e.

The operating lever unit 314 incorporates therein a relay member 345, which acts as a link mechanism, for interlinking the main wire 338 and the throttle cable 343, which extends to the carburetor to be described later, and interlinking the main wire 338 and a brake cable 344, which acts as a brake releasing cable, extending to the brake unit which will be described later.

One end of the main wire 338 has a wire terminal member 338a, which is larger in diameter than the main wire 338, and is connected to a relay member 345. The other end of the main wire 338 is connected to the wire connecting arm 332b of the throttle lever 332 via the wire terminal member 338b.

The throttle cable 343 is comprised of a throttle tube 343a, a throttle wire 343b moveably disposed in the throttle tube 343a, the wire terminal member 343c fixed to one end of the throttle wire 343b, and a tube terminal member 343d mounted to one end of the throttle tube 343b.

The brake cable 344 includes a brake tube 344a, a brake wire 344b moveably inserted through the brake tube 344a, a wire terminal member 344c mounted to one end of the brake wire 344b, and a tube terminal member 344d mounted to one end of the brake tube 344a. Also, reference numeral 331g designates a cable support portion formed in the handle case 331 for supporting the tube terminal members 343d, 344d.

The relay member 345 includes a C-shape, in cross section, which has one end formed with a first upright portion 345a with which the wire terminal member 338a of the main wire 338 is engageable and the other end formed with a second upright portion 345b with which wire terminal member 343c of the throttle cable 343 and the wire terminal member 344c of the brake cable 344 are engageable.

In a normal use wherein the throttle lever 332 is not gripped, the amount of protrusion of the throttle wire 343b extending from the throttle tube 343a of the throttle wire 343b is selected to be greater than that of the brake wire 344b from the brake tube 344a. And, the wire terminal member 344c of the brake cable 344 is held in abutting engagement with the second upright portion 345b of the relay member 345, and the wire terminal member 343c of the throttle cable 343 is spaced from the second upright portion 345b. That is, a distance between the wire terminal member 343c and the second upright portion 345b is determined to be greater than that between the wire terminal member 344c and the second upright portion 345b.

Thus, the relay member 345 according to the third preferred embodiment has a function as a delay mechanism 347 wherein the presence of the wire terminal member 343c of the throttle wire 343b is spaced from the wire terminal member 344c of the brake wire 344 enables the throttle wire 343b to be pulled with a time delay from the movement of the brake wire 344b when the main wire 338 is pulled to move the relay member 345.

Figure 23:
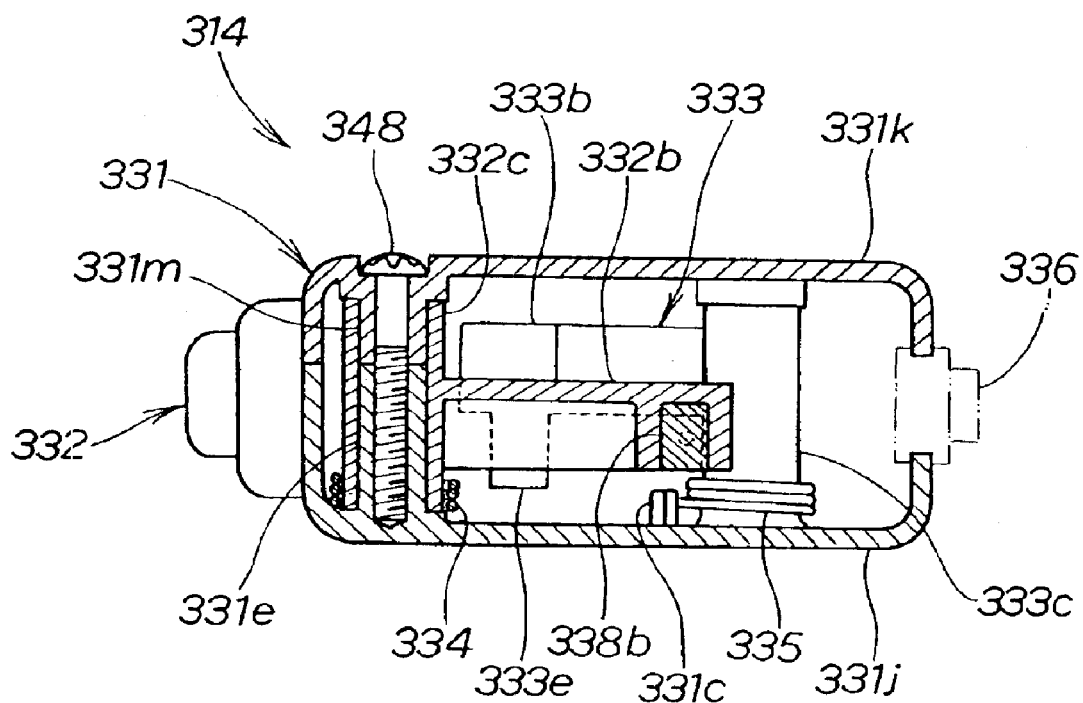
FIG. 23 is a cross sectional view taken along line 23—23 of FIG. 22.

As shown in FIG. 23, the handle case 331 is composed of first and second case halves 331j, 331k. A pivot shaft 331e is formed in the first case half 331j, and a pivot shaft 331m is formed in the second case half 331k, with the pivot shafts 331e, 331m being received in a bearing portion 332c. the wire connecting arm 332b extends from the bearing portion 332c whose distal end engages the wire terminal member 338b of the main wire 338 shown in FIG. 22. Reference numeral 348 designates a screw by which the first and second case halves 331j, 331k are coupled to one another.

Figure 24:
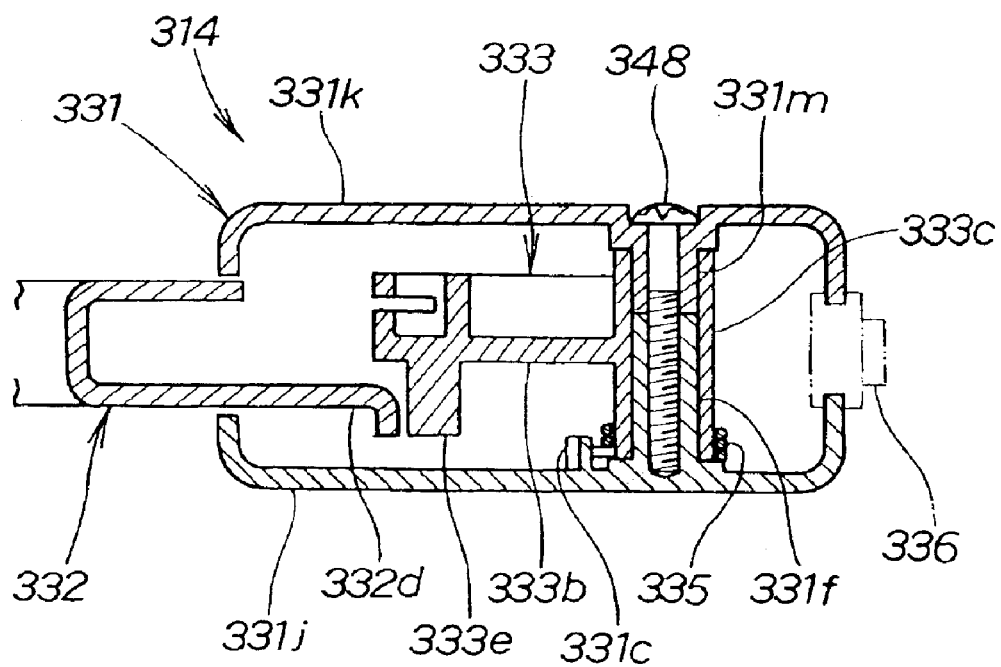
FIG. 24 is a cross sectional view taken along line 24—24 of FIG. 22.

In FIG. 24, the first case half 331j has a pivot shaft 331f, and the second case half 331k has a pivot shaft 331n. These pivot shafts 331*f*, 331*n* are received by a bearing portion 333*c*. A swing stopper arm 333*b* extends from the bearing portion 333*c*. A side projecting portion 333*e*, which is a distal end of the swing stopper arm 333*b*, is close to a projecting portion 332*d* of the throttle lever 332.

Figure 14:
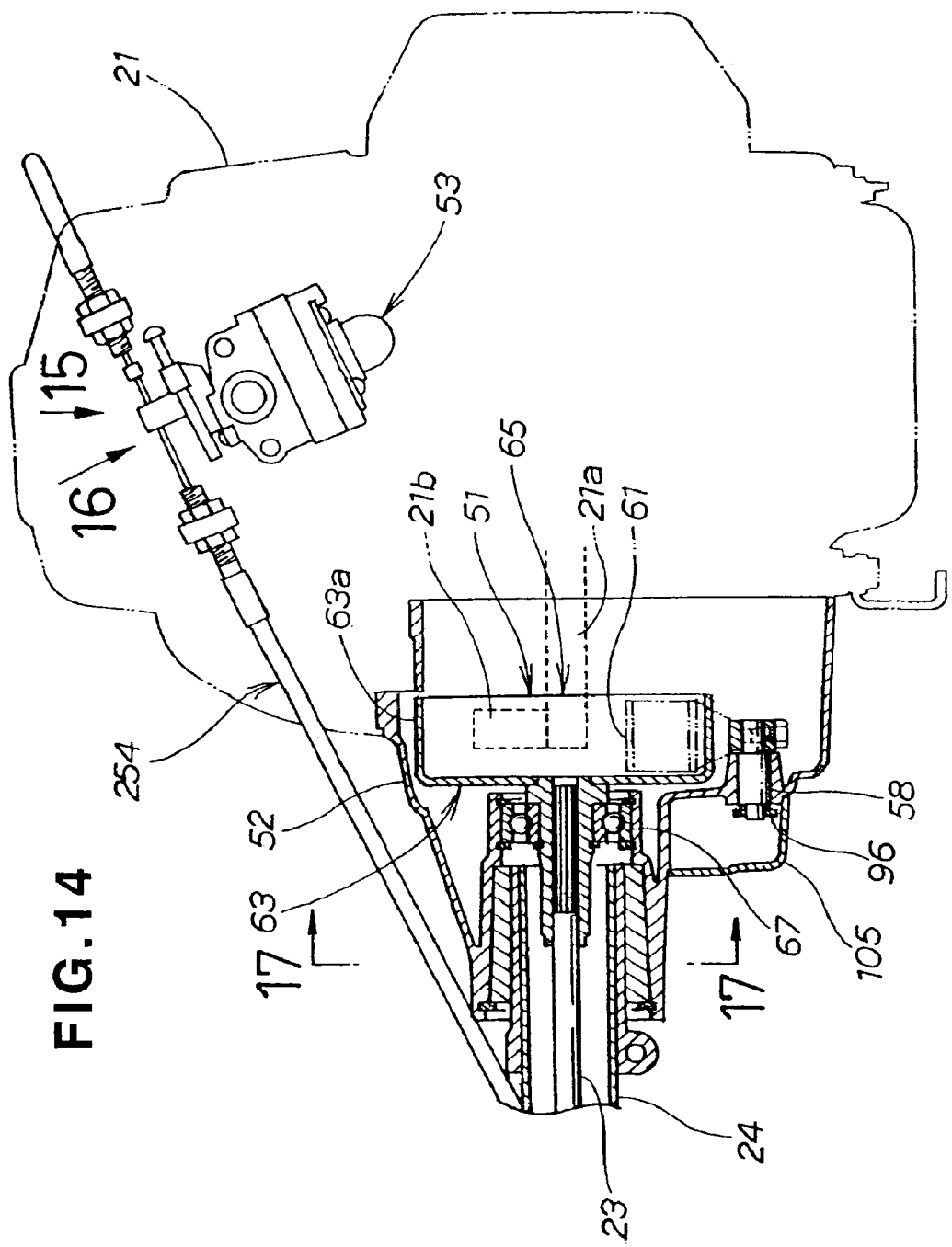
FIG. 14 is a partial cross sectional view of a bush cutting machine according to a second preferred embodiment of the present invention, wherein single piece of throttle cable allows the opening degree of the throttle to be adjusted and the brakes to be released, illustrating a carburetor, the brake unit and the throttle cable.
Figure 25:
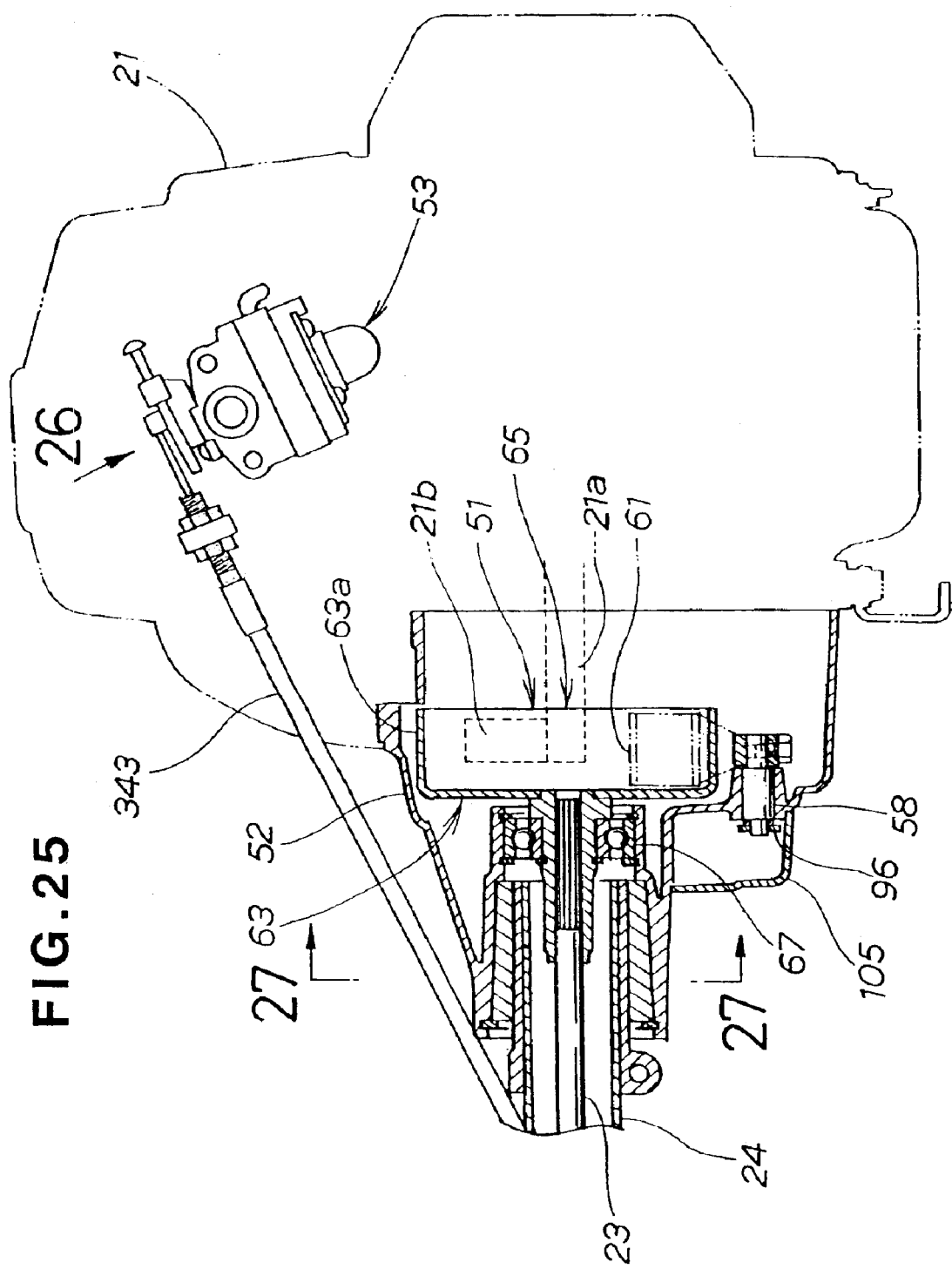
FIG. 25 is a cross sectional view of the brake unit with the relay member of FIG. 2 removed.
Figure 26:
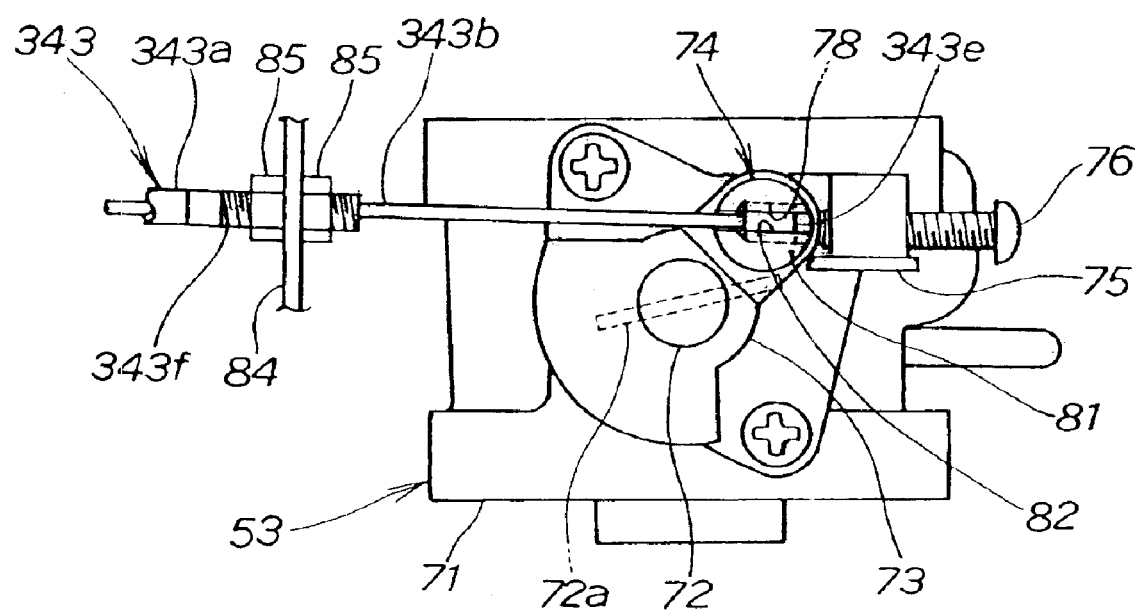
FIG. 26 is a view as seen in the direction of arrow 26 of FIG. 25, illustrating a relationship between the throttle wire and the throttle arm.

FIG. 25 is a view which corresponds to the cross sectional view of the front portion of the engine of the bush cutting machine shown in FIG. 14 in conjunction with the second preferred embodiment. The throttle cable 343 and the throttle arm 73 are similar in structure and in operation to those shown in FIG. 3 in conjunction with FIG. 3, and a detailed description is herein omitted. Reference numeral 343*e* shown in FIG. 26 designates a cylindrical member which corresponds to the cylindrical member 54*c* shown in FIG. 3, and reference numeral 343*f* designates a tube terminal member which corresponds to the tube terminal member 54*d* shown in FIG. 3.

Figure 27:
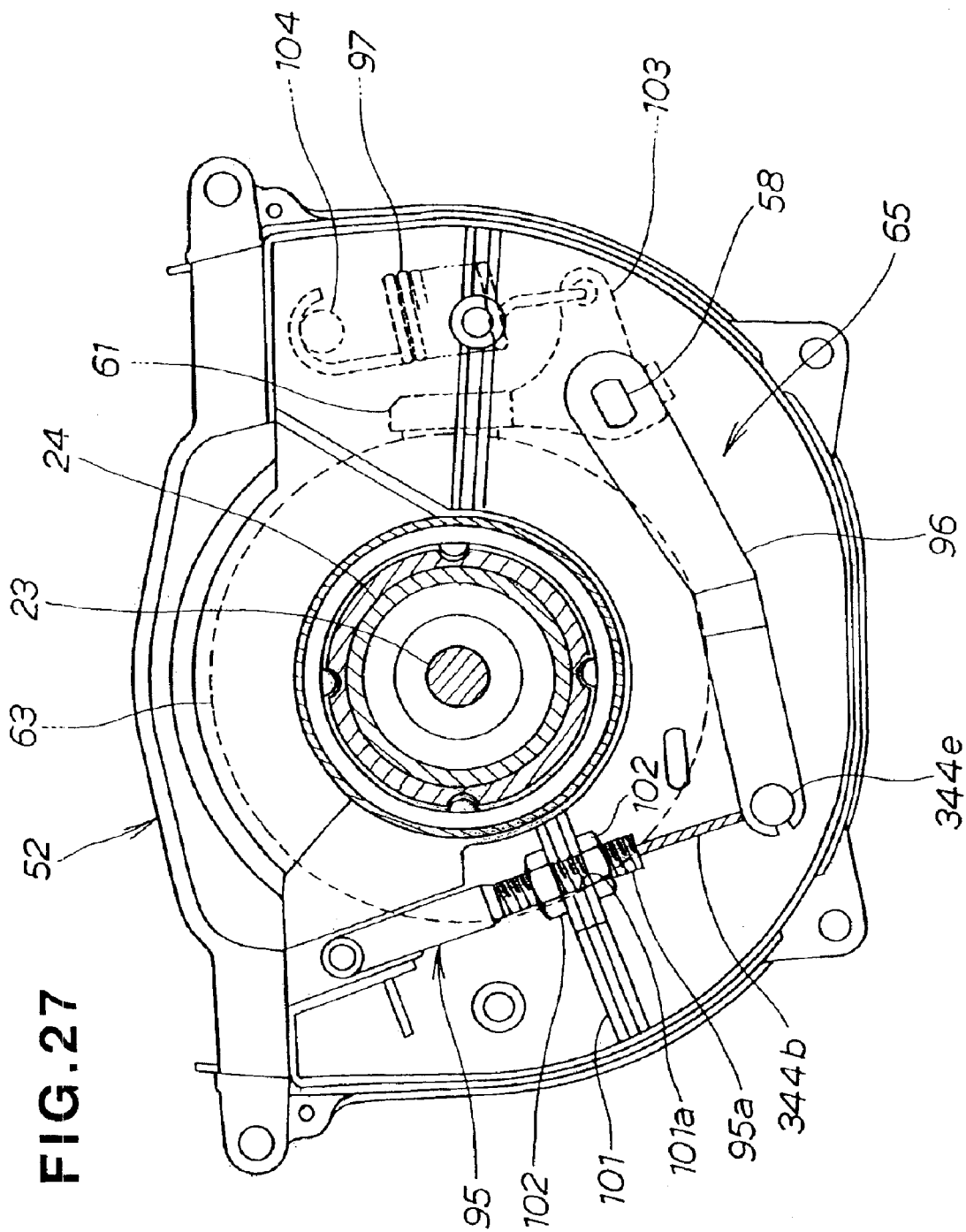
FIG. 27 is a cross sectional view taken along line 27—27 of FIG. 25, illustrating the brake unit.

FIG. 27 shows the brake unit 65 according to the third preferred embodiment. Reference numeral 344*e* designates a wire terminal member located at the distal end of the brake wire 344*b* for connecting the brake wire 344*b* to the brake arm 96. The brake unit according to such preferred embodiment is similar in structure and operates in the same manner as the brake unit 65 shown in FIG. 6 in conjunction with the first preferred embodiment, with like parts bearing the same reference numerals as those used in FIG. 6 to omit a description of the same parts.

Now, an operation of the operating lever unit 314 according to the third preferred embodiment and the engine are described below with reference to FIGS. 28A to 31.

First, the engine is started up and brought into an idling state.

When this occurs, the centrifugal clutch 51 shown in FIG. 25 remains in an uncoupled state due to the rotational speed of the engine being below the given value. Also, since the drum 63 shown in FIG. 27 is urged with the brake shoe 61, the cutter blade 22 shown in FIG. 20 remains inoperative.

Under such a condition, in FIG. 8A, the palm restraining portion 333*a* of the lock lever 333 is pressed in the clockwise direction with the palm of the hand as shown by the arrow a and the lock lever 333 is rotated while the grip portion 331*d* of the handle case 331 is gripped. This compels the swing stopper arm 333*b* of the lock lever 333 to be rotated in the direction as shown by the arrow a, causing the swing stopper arm 333*b* and the projecting portion 332*d* of the throttle lever 332 to be brought into disengagement from one another such that the lock condition of the throttle lever 32 is released to enable the operation of the throttle lever 32.

Figure 28A:
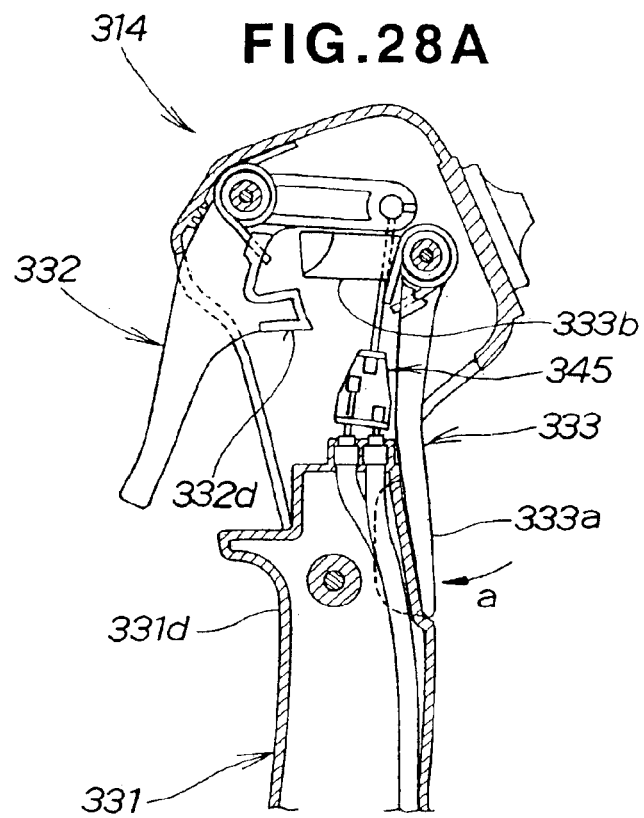
FIGS. 28A and 28B illustrate an operation of the operating lever unit according to the third embodiment.
Figure 28B:
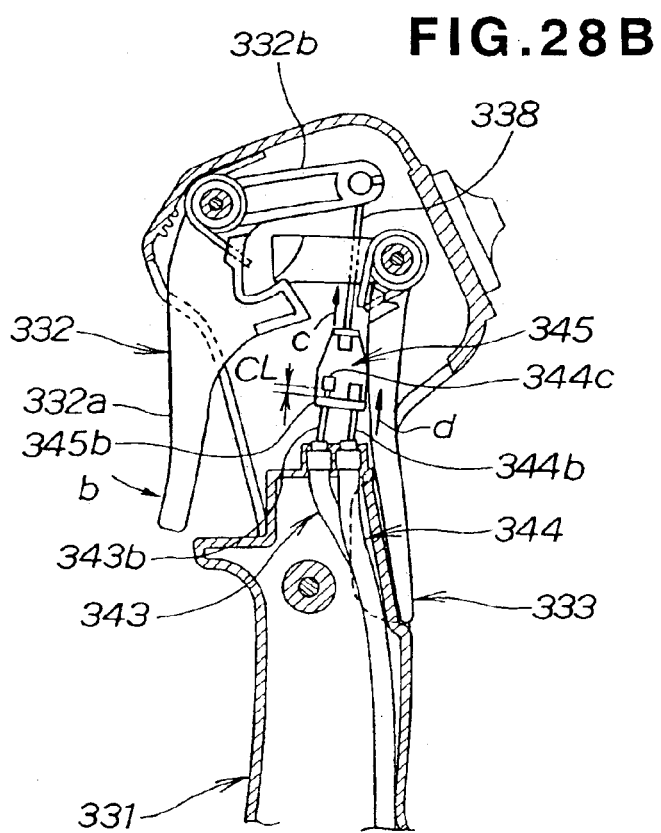
Figure 29:
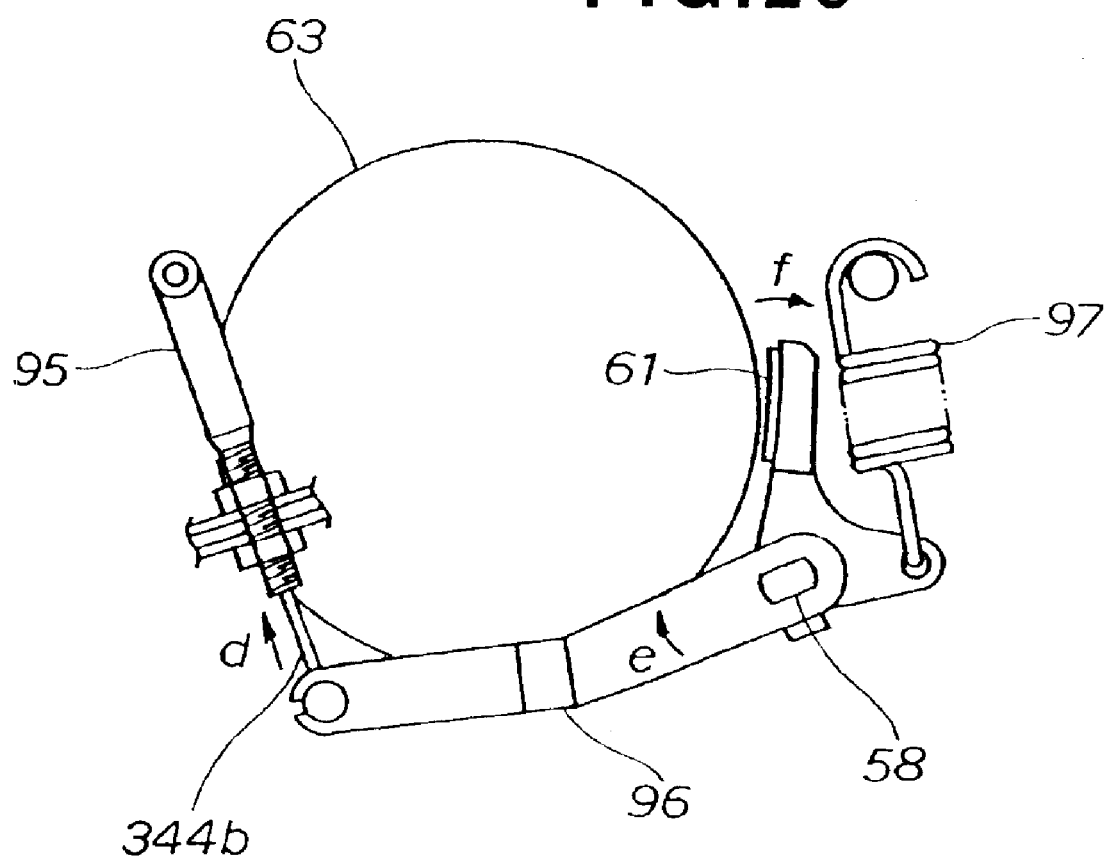
FIG. 29 is a view illustrating an operation of the brake unit which is released when the throttle lever shown in FIG. 28B is rotated an angle up to midway of the throttle lever to pull the throttle wire.

In FIG. 28B, the operating section 332*a* of the throttle lever 332 is rotated counterclockwise with the finger up to the midway of the fully movable range of the throttle lever 332 in the direction as shown by the arrow b. Then, the main wire 338 is pulled in the direction as shown by the arrow c, thereby shifting the relay member 345 in the direction as shown by the arrow c.

Due to such shifting movement, the brake wire 344*b* of the brake cable 344 is pulled in a substantially concurrent movement of the main wire 338 in the direction as shown by the arrow d. When this takes place, since there is a clearance CL between the wire terminal member 344*c* of the throttle cable 343 and the second upright portion 345*b* of the relay member 345, the throttle wire 343*b* is not pulled.

When the brake wire 344*b* is pulled in the direction as shown by the arrow d, the brake arm 96 rotates about the center of the pivot shaft 58 in the direction as shown by the arrow e. The brake shoe 61, which is integral with the brake arm 96, rotates in the direction as shown by the arrow f against the force of the tension coil spring 87, compelling the brake shoe 61 to be displaced from the drum 63 for thereby releasing the brake.

Figure 30A:
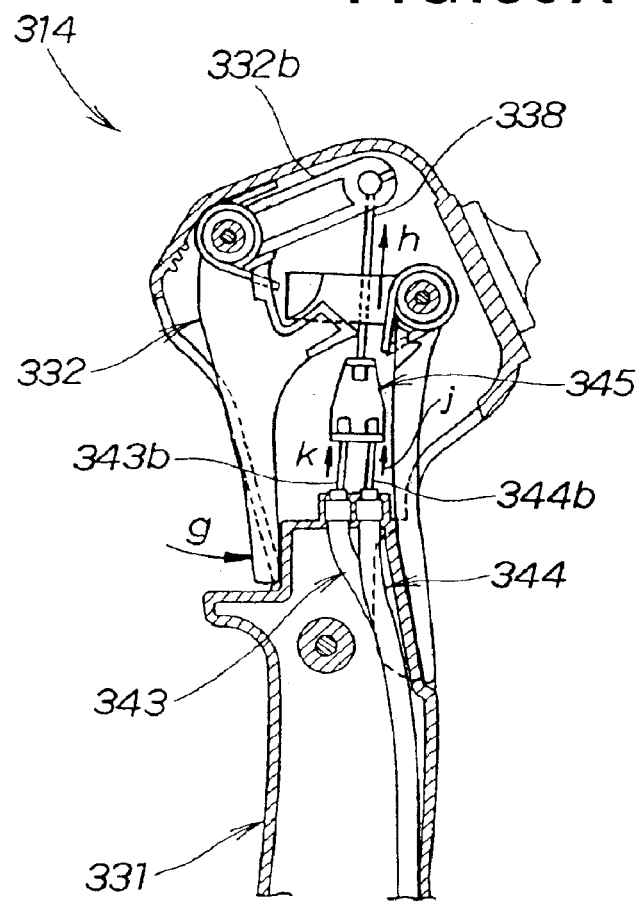
FIG. 30A is a view illustrating an operation of the operating lever unit with the throttle lever fully gripped at its extreme position.

As shown in FIG. 30A, when gripping the throttle lever 332 further deeply in the direction as shown by the arrow g to rotate the same, the main wire 338 is further pulled in the direction as shown by the arrow h such that the relay member 345 is further moved upward. When this takes place, the brake wire 344*b* is further moved in the direction as shown by the arrow j, allowing the throttle wire 343*b*, which has not been pulled as shown in FIG. 28B, to be pulled in the direction as shown by arrow k.

Figure 30B:
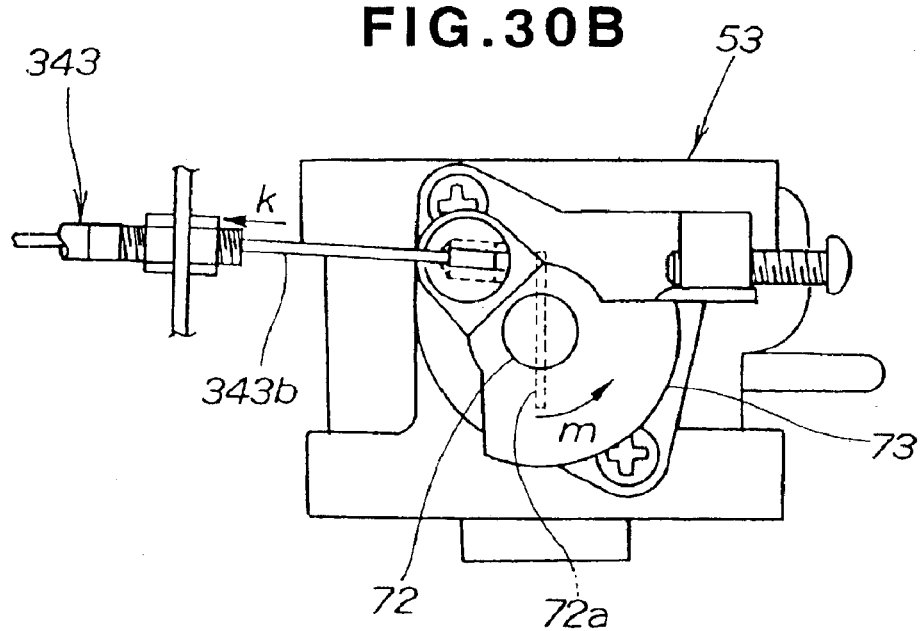
FIG. 30B is a view illustrating an operation with the throttle wire pulled and the throttle valve opened.

When the throttle wire 343*b* is pulled in the direction as shown by the arrow k, the throttle arm 73 of the carburetor 53 rotates about the center of the throttle shaft 72 in the direction as shown by the arrow m as shown in FIG. 30B. Due to such rotation, the throttle valve 72*a* mounted to the throttle shaft 72 is released, with a resultant increase in engine speed. If the engine speed exceeds the given value, the centrifugal clutch 51 shown in FIG. 25 is brought into a coupled condition to allow the drive power from the engine 21 to be transmitted to the cutter blade which in turn is rotated.

Figure 31:
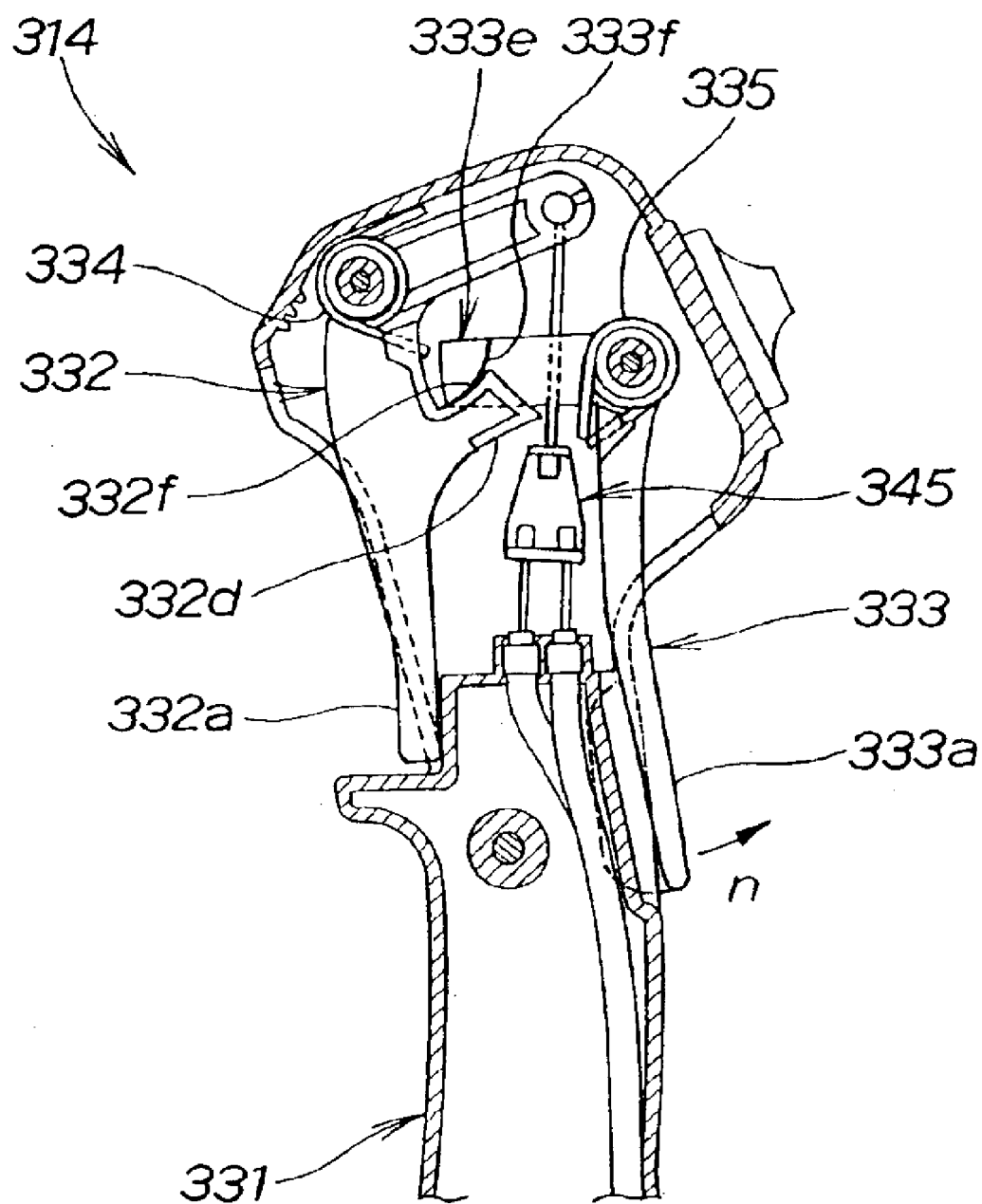
FIG. 31 illustrates an operation of the operating lever unit with the throttle lever locked with the throttle lever.

When removing the palm of the hand from the lock lever 333 while gripping the handle case 331, the lock lever 333 is caused to swing in the direction as shown by the arrow n as shown in FIG. 31 due to repulsive power of the tension coil spring 335. As a result, the circular arc wall 333*f* of the sidewise protrusion 333*e* of the lock lever 333 and the side wall 332*f* of the protruding section 332*d* of the throttle lever 332 are brought into engaging contact with one another such that, even when the finger is removed from the operating section 332*a* of the throttle lever 332, the throttle lever 332 is enabled to remain stationary due to the frictional force between the circular arc wall 333*f* and the side wall 332*f*.

Regardless of the position of the throttle lever 332 shown in the drawings, if the circular arc wall 333*f* and the side wall 332*f* are located in a position to be held in engaging contact with one another, it is possible for the finger to be removed from the throttle lever 332 for thereby eliminating the load for operating the lever.

As previously discussed above, with the bush cutting machine according to the third preferred embodiment, manipulating only the throttle lever 332 compels both the throttle shaft 72, connected to the throttle cable 343, and the brake arm 96, connected to the brake cable 44, to be operated via the relay member 345 which serves as the link member, providing an ease of carrying out the adjustment for the opening degree of the throttle valve, and the actuation or releasing operation of the brake unit.

Next, a modified form of the third preferred embodiment, i.e. an example wherein a relay member serving as a link mechanism is located in the operating lever 14 (corresponding to a component part 421 in the presently filed modification) which is contained in the bush cutting machine of the first preferred embodiment shown in FIG. 1, is described below with reference to FIG. 32. Also, the same component parts as those of the operating lever unit 314 of the third preferred embodiment shown in FIG. 22 bear the same reference numerals as those used therein and detailed description of the same is herein omitted.

In FIG. 32, the operating lever unit 421 includes a handle case 426, a throttle lever 427 swingably mounted to the handle case 426 for adjusting the rotational speed of the engine shown in FIG. 1, a lock lever 428 swingably mounted to the handle case 426 for locking the swinging movement of the throttle lever 427, and a kill switch 431 for stopping the engine 21. Reference numeral 424 designates a twisted coil spring for urging the throttle lever 427 in a clockwise direction at all times, and reference numeral 435 designates a twisted coil spring for urging the lock lever 428 counterclockwise at all times.

The handle case 426 is composed of two case halves which sandwiches the operation rod 24. A longitudinal one end of the handle case 426 is formed with projecting segments 426a, 426a, protruding from the two case halves, respectively, (with one of the projecting segments 426a being not shown) which are tightened with a bolt 437, with the other longitudinal end being tightened with a bolt (not shown) to fixedly secure the handle case 426 to the operation rod 24.

The throttle lever 427 is comprised of an operating section 427a with which fingers are hooked, a wire connecting arm 427b connected to the main wire 338, a bearing portion 427c which supports a pivot shaft 426b mounted to the handle case 426.

The lock lever 428 serves as a member for restricting the operation of the throttle lever 427 when the brake is applied to the cutter blade 22 under the idling condition of the engine 21 shown in FIG. 1. The throttle lever 428 is comprised of an arm engaging segment 428b engaging the wire connecting arm 427b of the throttle lever 427 and a bearing portion 428c which supports a pivot shaft 426c mounted to the handle case 426.

The operating lever unit 421 incorporates therein a link mechanism for interlinking the movement of the main wire 338 with the throttle cable 343 and the brake cable 344. More particularly, the operating lever unit 421 incorporates therein a relay member 438 which serves as the ink mechanism which interlinks the main wire 338 and the throttle cable 343 extending to the carburetor 53 shown in FIG. 25 and also interlinks the main wire 338 and the brake cable 344 extending to the brake unit 65.

The wire terminal member 338 formed at the one end of the main wire 338 is connected to the relay member 438, with the wire terminal member 338b formed at the other end of the main wire 338 being connected to the wire connecting arm 427b of the throttle lever 427.

The handle case 438 includes a cable support portion 426d for supporting the throttle tube 343a of the throttle cable 343, and a cable support portion 426e for supporting the brake tube 344a of the brake cable 344.

The relay member 438 includes a circular arc member which has a C-shape, in cross section taken in a direction along the axis of the operation rod 24, and which copes, in cross section perpendicular to the axis of the operation rod 24, with the outer circumferential periphery of the operation rod 24. The wire terminal member 338a of the main wire 338 engages a first upright portion 438a formed at one end of the relay member 438, whose other end is formed with a second upright portion 438b to which the wire terminal member 343c of the throttle cable 343 and the wire terminal member 344c of the brake cable 344 are hooked.

In FIG. 32, the amount of protrusion of the throttle wire 343b extending from the throttle tube 343a is selected to be greater than that of the brake wire 344b extending from the brake tube 344a. Also, the wire terminal member 344c of the brake cable 344 is held in substantially abutting engagement with the second upright portion 438b of the relay member 438, and the wire terminal member 343c of the throttle cable 343 is spaced from the second upright portion 438b. That is, a distance between the wire terminal member 343c and the second upright portion 438bb is determined to be greater than that between the wire terminal member 344c and the second upright portion 438b.

Thus, the relay member 438 according to the present modification has a function as a delay mechanism 441 wherein the presence of the wire terminal member 343c of the throttle wire 343b is spaced from the wire terminal member 344c of the brake wire 344 enables the throttle wire 343b to be pulled with a time delay from the movement of the brake wire 344b when the main wire 338 is pulled to move the relay member 345.

The relay member 438 according to the modification described above has the same function as the relay member 345 shown in FIG. 22, and a description of the same is herein omitted.

The degree of tension of the throttle wire 343b may be adjusted by loosening the nuts 443, 443 screwed to the male thread formed on the case mount member 343g formed at the end of the throttle tube 343a and tightening the nuts 443, 443 subsequent to the case mount member 443g being adjusted in a longitudinal axis thereof.

The degree of tension of the brake wire 344b may be adjusted in the same manner as described above by loosening the nuts 443, 443 screwed to the male thread formed on the case mount member 344g formed at the end of the brake tube 344a and tightening the nuts 443, 443 subsequent to the case mount member 344g being adjusted in a longitudinal axis thereof.

The present disclosure relates to the subject matters of Japanese Patent Application No. 2001-004233, filed Jan. 11, 2001, Japanese Patent Application No. 2001-006314, filed Jan. 15, 2001, and Japanese Patent Application No. 2001-006352, filed Jan. 15, 2001, the disclosures of which are expressly incorporated herein by reference in their entireties.

What is claimed is:

1. A bush cutting machine comprising:
   an operation rod;
   a cutter blade mounted to the front end of the operation rod for undergoing rotation;
   a prime mover mounted to the rear end of the operation rod for rotationally driving the cutter blade;
   a throttle lever pivotally mounted with respect to the operation rod for controlling an opening degree of a throttle valve of the prime mover to adjust a rotational speed of the cutter blade;
   a brake unit for stopping rotation of the cutter blade;
   a link mechanism actuated by operation of the throttle lever to adjust the degree of opening of the throttle valve of the prime mover; and
   a single piece of throttle cable extending between the throttle lever and the brake unit;
   wherein the link mechanism is disposed midway of the single piece of throttle cable so that the control of the opening degree of the throttle valve and the release of the brake unit from the braking condition are achieved by manipulation of the single piece of throttle cable.

2. A bush cutting machine according to claim 1; wherein the link mechanism serves as a delay mechanism actuated by operation of the throttle lever such that the throttle valve opens with a time delay upon release of the brake unit from the braking condition.

* * * * *